(12) United States Patent
Yousefiani et al.

(10) Patent No.: US 10,316,792 B2
(45) Date of Patent: *Jun. 11, 2019

(54) BUILT-UP COMPOSITE STRUCTURES WITH A GRADED COEFFICIENT OF THERMAL EXPANSION FOR EXTREME ENVIRONMENT APPLICATIONS

(71) Applicant: The Boeing Company, Chicago, IL (US)

(72) Inventors: Ali Yousefiani, Arcadia, CA (US); John G. Vollmer, Lomita, CA (US); Michael L. Hand, Huntington Beach, CA (US); John M. Comfort, Corona, CA (US)

(73) Assignee: The Boeing Company, Chicago, IL (US)

( * ) Notice: Subject to any disclaimer, the term of this patent is extended or adjusted under 35 U.S.C. 154(b) by 1550 days.

This patent is subject to a terminal disclaimer.

(21) Appl. No.: 13/948,260

(22) Filed: Jul. 23, 2013

(65) Prior Publication Data

US 2013/0305727 A1 Nov. 21, 2013

Related U.S. Application Data

(62) Division of application No. 12/110,595, filed on Apr. 28, 2008, now Pat. No. 8,512,808.

(51) Int. Cl.
  *C23C 4/04* (2006.01)
  *F02K 1/00* (2006.01)
  (Continued)

(52) U.S. Cl.
  CPC .............. *F02K 1/00* (2013.01); *B22F 3/1055* (2013.01); *B22F 3/115* (2013.01); *B22F 5/009* (2013.01);
  (Continued)

(58) Field of Classification Search
  CPC .................................. B22F 3/15; B22F 5/009
  (Continued)

(56) References Cited

U.S. PATENT DOCUMENTS 2,759,249 A 8/1956 Eberle
3,284,174 A 11/1966 Zimmer
(Continued)

FOREIGN PATENT DOCUMENTS

EP  0109814 A2  5/1984
EP  0459865 A1  12/1991
(Continued)

OTHER PUBLICATIONS

Blosser, "Thermal-Stress-Free Fasteners for Joining Orthotropic Materials," NASA Technical Memorandum 100489, Aug. 1987, 11 pages.
(Continued)

*Primary Examiner* — Jie Yang
(74) *Attorney, Agent, or Firm* — Yee & Associates, P.C.

(57) ABSTRACT

An integrated composite structure with a graded coefficient of thermal expansion (CTE) is formed by selecting a plurality of layers of materials with a graded CTE and using build-up (bottom-up) fabrication approaches such as metal deposition or powder metallurgy to produce a CTE-graded layered composite preform, which is then consolidated and heat treated to create the CTE graded integrated composite billet or near net shape. The integrated composite billet or near net shape is then processed to produce a first surface for attachment of a first structural member having a first CTE and to produce a second surface of for attachment of a second structural member having a second CTE.

22 Claims, 22 Drawing Sheets

(51) Int. Cl.
*B22F 3/105* (2006.01)
*B22F 3/115* (2006.01)
*B22F 7/08* (2006.01)
*F02K 1/78* (2006.01)
*F02K 9/34* (2006.01)
*B22F 5/00* (2006.01)
*C23C 28/02* (2006.01)
*B33Y 50/00* (2015.01)

(52) U.S. Cl.
CPC .................. *B22F 7/08* (2013.01); *C23C 4/04* (2013.01); *C23C 28/021* (2013.01); *C23C 28/023* (2013.01); *C23C 28/028* (2013.01); *F02K 1/78* (2013.01); *F02K 9/34* (2013.01); *B22F 2999/00* (2013.01); *B33Y 50/00* (2014.12); *F05D 2300/21* (2013.01); *F05D 2300/50212* (2013.01); *F05D 2300/603* (2013.01); *Y02P 10/295* (2015.11); *Y10T 29/49616* (2015.01); *Y10T 428/12611* (2015.01)

(58) Field of Classification Search
USPC ............................................ 427/258; 75/206
See application file for complete search history.

(56) References Cited

U.S. PATENT DOCUMENTS

| | | | |
|---|---|---|---|
| 3,633,520 A * | 1/1972 | Stiglich, Jr. | ........... F41H 5/0421 109/49.5 |
| 4,010,965 A | 3/1977 | Izuma et al. | |
| 4,247,036 A | 1/1981 | Salesse et al. | |
| 4,281,941 A | 8/1981 | Rottenkolber | |
| 4,333,670 A | 6/1982 | Holko | |
| 4,333,671 A | 6/1982 | Holko | |
| 4,512,699 A | 4/1985 | Jackson et al. | |
| 4,702,406 A | 10/1987 | Sullivan et al. | |
| 4,702,503 A | 10/1987 | Von Koch | |
| 4,834,569 A | 5/1989 | Foote et al. | |
| 5,366,290 A | 11/1994 | Mayer et al. | |
| 5,439,306 A | 8/1995 | Lhernould | |
| 5,633,093 A | 5/1997 | Rhoda et al. | |
| 5,811,055 A | 9/1998 | Geiger | |
| 5,861,714 A * | 1/1999 | Wei | .......... H01J 9/323 220/2.1 R |
| 6,037,066 A | 3/2000 | Kuwabara | |
| 6,089,444 A | 7/2000 | Slattery et al. | |
| 6,132,857 A | 10/2000 | Champenois et al. | |
| 6,227,432 B1 | 5/2001 | Enomoto et al. | |
| 6,352,385 B1 | 3/2002 | Wojciechowski et al. | |
| 6,381,949 B1 | 5/2002 | Kreiner et al. | |
| 6,733,907 B2 | 5/2004 | Morrison et al. | |
| 6,912,984 B2 | 7/2005 | Narasimham et al. | |
| 7,097,091 B2 | 8/2006 | Okamura et al. | |
| 7,470,341 B2 | 12/2008 | Keshavan et al. | |
| 7,543,662 B2 * | 6/2009 | Belnap | ................. E21B 10/573 175/426 |
| 7,754,342 B2 | 7/2010 | Hazel et al. | |
| 7,762,447 B2 | 7/2010 | Feng et al. | |
| 7,807,231 B2 | 10/2010 | Gorman et al. | |
| 8,512,808 B2 * | 8/2013 | Yousefiani | ........... B22F 3/1055 427/258 |
| 2004/0024482 A1 | 2/2004 | White et al. | |
| 2005/0042023 A1 | 2/2005 | Jones | |
| 2006/0255099 A1 | 11/2006 | Balbach et al. | |
| 2008/0160274 A1 | 7/2008 | Dang | |
| 2009/0208773 A1 | 8/2009 | Dupont | |
| 2009/0266870 A1 | 10/2009 | Yousefiani et al. | |
| 2009/0269497 A1 | 10/2009 | Yousefiani et al. | |

FOREIGN PATENT DOCUMENTS

| | | |
|---|---|---|
| EP | 1842937 A2 | 10/2007 |
| GB | 1509644 A | 5/1978 |
| JP | S63013664 A | 1/1988 |

OTHER PUBLICATIONS

Khaled, "An Outsider Looks at Friction Stir Welding," Federal Aviation Administration Report # ANM-112N-05-06, Jul. 2005, 71 pages.

Sireesha et al., "A comparative evaluation of welding consumables for dissimilar welds between 316In austenitic stainless steel and alloy 800", Journal of Nuclear Materials, vol. 279, No. 1, pp. 65-76.

Office Action, dated Oct. 15, 2009, regarding U.S. Appl. No. 12/108,480, 17 pages.

Final Office Action, dated Feb. 2, 2011, regarding U.S. Appl. No. 12/108,480, 19 pages.

Office Action, dated Apr. 4, 2013, regarding U.S. Appl. No. 12/108,480, 26 pages.

Office Action, dated Feb. 14, 2012, regarding U.S. Appl. No. 112/110,595, 21 pages.

Final Office Action, dated Jul. 24, 2012, regarding U.S. Appl. No. 112/110,595, 15 pages.

Office Action, dated Dec. 18, 2012, regarding U.S. Appl. No. 112/110,595, 15 pages.

Notice of Allowance, dated Mar. 25, 2013, regarding U.S. Appl. No. 112/110,595, 10 pages.

Notice of Allowance, dated Apr. 11, 2013, regarding U.S. Appl. No. 112/110,595, 13 pages.

\* cited by examiner

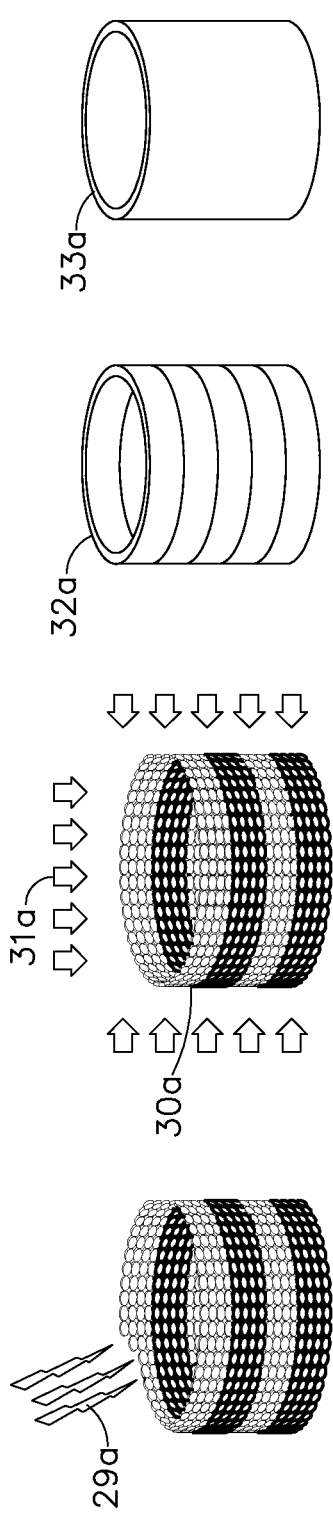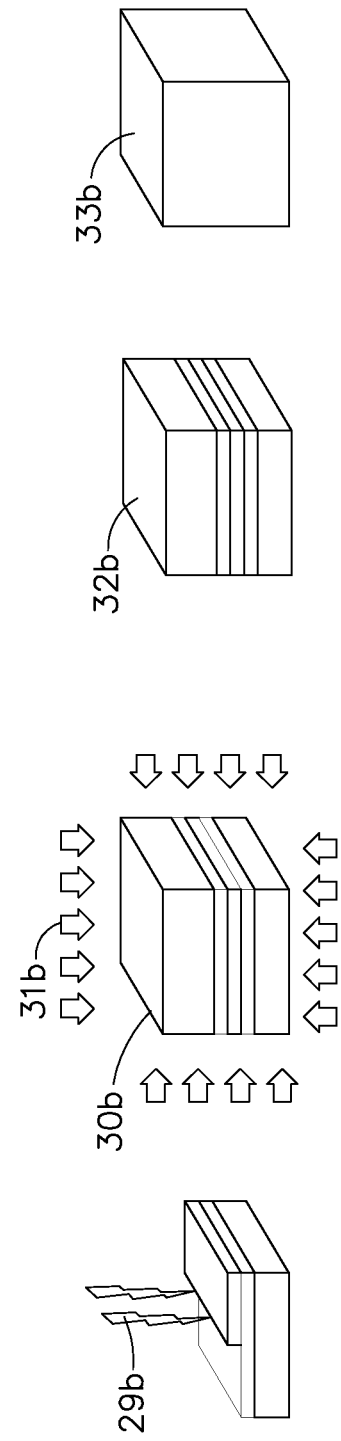

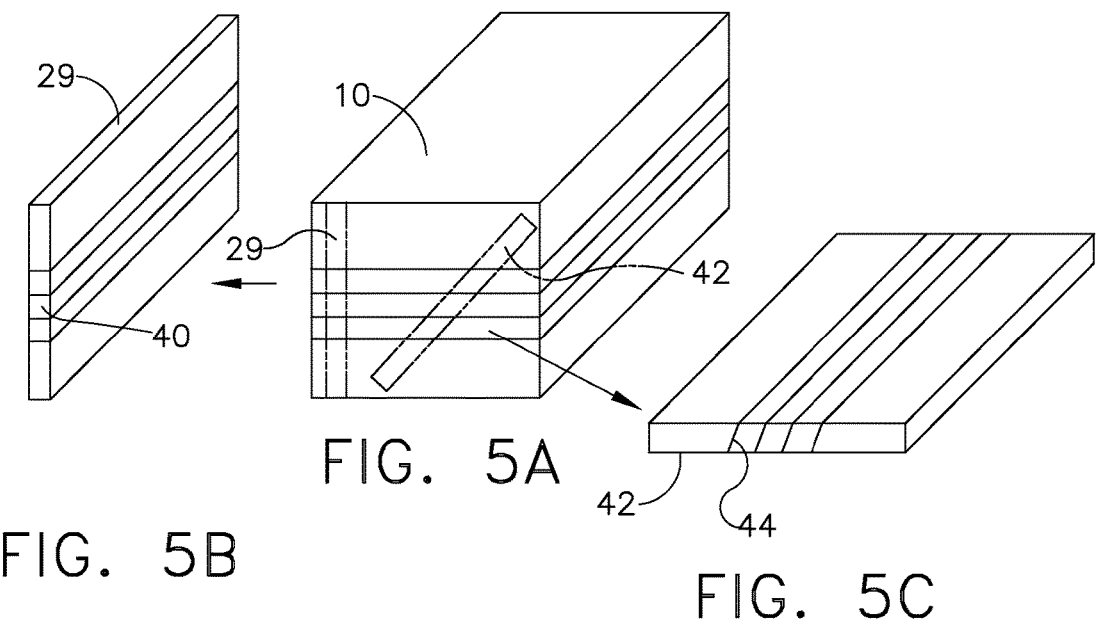

BUILT-UP COMPOSITE STRUCTURES WITH A GRADED COEFFICIENT OF THERMAL EXPANSION FOR EXTREME ENVIRONMENT APPLICATIONS

This application is a divisional of U.S. patent application Ser. No. 12/110,595, filed on Apr. 28, 2008, which is incorporated herein by reference.

REFERENCE TO RELATED APPLICATIONS

This application is related to co-pending patent application Ser. No. 12/108,480 entitled JOINED COMPOSITE STRUCTURES WITH A GRADED COEFFICIENT OF THERMAL EXPANSION FOR EXTREME ENVIRONMENT APPLICATIONS filed Apr. 23, 2008.

BACKGROUND

Field

Embodiments of the disclosure relate generally to the field of structures for interattachment of materials and components with significantly differing coefficients of thermal expansion (CTE) and more particularly to a composite structure with constituents having a graduated CTE for connection of two structures with vastly different CTE and a method for creation of the graded CTE composite structure.

Description of the Related Art

The need for higher capability, weight efficient, and long lasting extreme environment structures has necessitated the use of higher capability advanced extreme environment materials (e.g., without limitation, ceramic matrix composites, carbon-carbon composites, refractory metals/alloys/intermetallics, cermets, and intermetallic compounds). Such advanced materials possess vastly different CTEs compared to common structural alloys. Additionally, they may be less ductile. Incorporation of such advanced materials into the design of an extreme environment structure inevitably may require them to be attached, at some point, to common structural alloys with much higher CTE and ductility. When exposed to the intended extreme environments, significantly high thermal stresses and strains may be developed, which may lead to undesirable results. This has been a critical issue, which has either completely restricted the use of these advanced structural materials or has resulted in costs skyrocketing, whether it be for weight penalties or increase in complexity of designs to allow for attachment to available structural alloys. Attaching members with dramatically different CTEs for use in high and low temperature applications is an extremely challenging task. Existing solutions (which are usually not feasible if members have dramatically different CTEs) mainly involve complicated mechanical fastening devices, which may involve complex mechanisms and/or complex designs to allow for relative movement between members with different CTEs when the assembly is heated or cooled. Existing solutions tend to be non-rigid due to the fact that they may be inherently flexible to allow relative movement and they may have features that are not favorable for use in typical high temperature applications, such as engines, turbines, and vehicle leading edges.

It is therefore desirable to provide a structure that can be used to attach members with vastly different CTE to produce an assembly that can be heated or cooled without introducing significant thermal stresses or strains.

It is further desirable to provide a system that does not rely on complicated mechanisms and complex designs to allow relative deformation during heating or cooling, allowing for a substantially rigid solution tailored to inherently accommodate for the wide CTE mismatch encountered in extreme environment applications such as engines, turbines and vehicle leading edge subsytems.

SUMMARY

A graded coefficient of thermal expansion (CTE) interface is provided by a composite structure having a first end for attachment to a structural component with a first CTE and a second end for attachment to a second structural component with a second CTE. Multiple layers with graded CTE are selected and build-up fabrication processes are employed to create a layered composite billet or near net shape with a graded CTE. The CTE-graded layered composite billet or near net shape is provided in a first embodiment by typical metal deposition techniques and in a second embodiment by typical powder metallurgy techniques. The composite billet or near net shape is then processed to produce a first surface for attachment of a first structural member having a first CTE and to produce a second surface for attachment of a second structural member having a second CTE. The resulting assembly provides capability for attaching structural members with vastly different CTE to produce an assembly that can be heated or cooled without introducing significant thermal stresses or strains. Additionally, the assembly does not rely on complicated mechanisms and complex designs to allow relative movement during heating or cooling, allowing for a substantially rigid solution tailored to inherently accommodate for the wide CTE mismatch.

Production of an integrated composite interface with a graded coefficient of thermal expansion (CTE) in a first method embodiment is accomplished using typical powder metallurgy techniques to create a CTE-graded layered composite billet or near net shape, which is then consolidated if necessary and post processed (heat treated, formed and/or machined) to provide a first surface for attachment of a first structural member having a first CTE and a second surface for attachment of a second structural member having a second CTE. The CTE-graded layered composite interface is produced in a second method embodiment using typical powder metallurgy techniques to produce a CTE graded near net shape perform, which is then consolidated if necessary and post processed (heat treated, formed and/or machined) to provide a first surface for attachment of a first structural member having a first CTE and a second surface of for attachment of a second structural member having a second CTE.

BRIEF DESCRIPTION OF THE DRAWINGS

The features and advantages of embodiments disclosed herein will be better understood by reference to the following detailed description when considered in connection with the accompanying drawings, wherein:

FIGS. 3A-3D are representations of typical metal deposition processing steps to produce a CTE-graded layered composite near net shape;

FIGS. 3E-3H are representations of typical metal deposition processing steps to produce a CTE-graded layered composite billet;

FIG. 5A is an exemplary graded CTE composite billet as produced by the method embodiments herein;

FIGS. 5B and 5C are elements machined from the billet of FIG. 5A to provide alternate layered interfaces;

DETAILED DESCRIPTION

Figure 1:
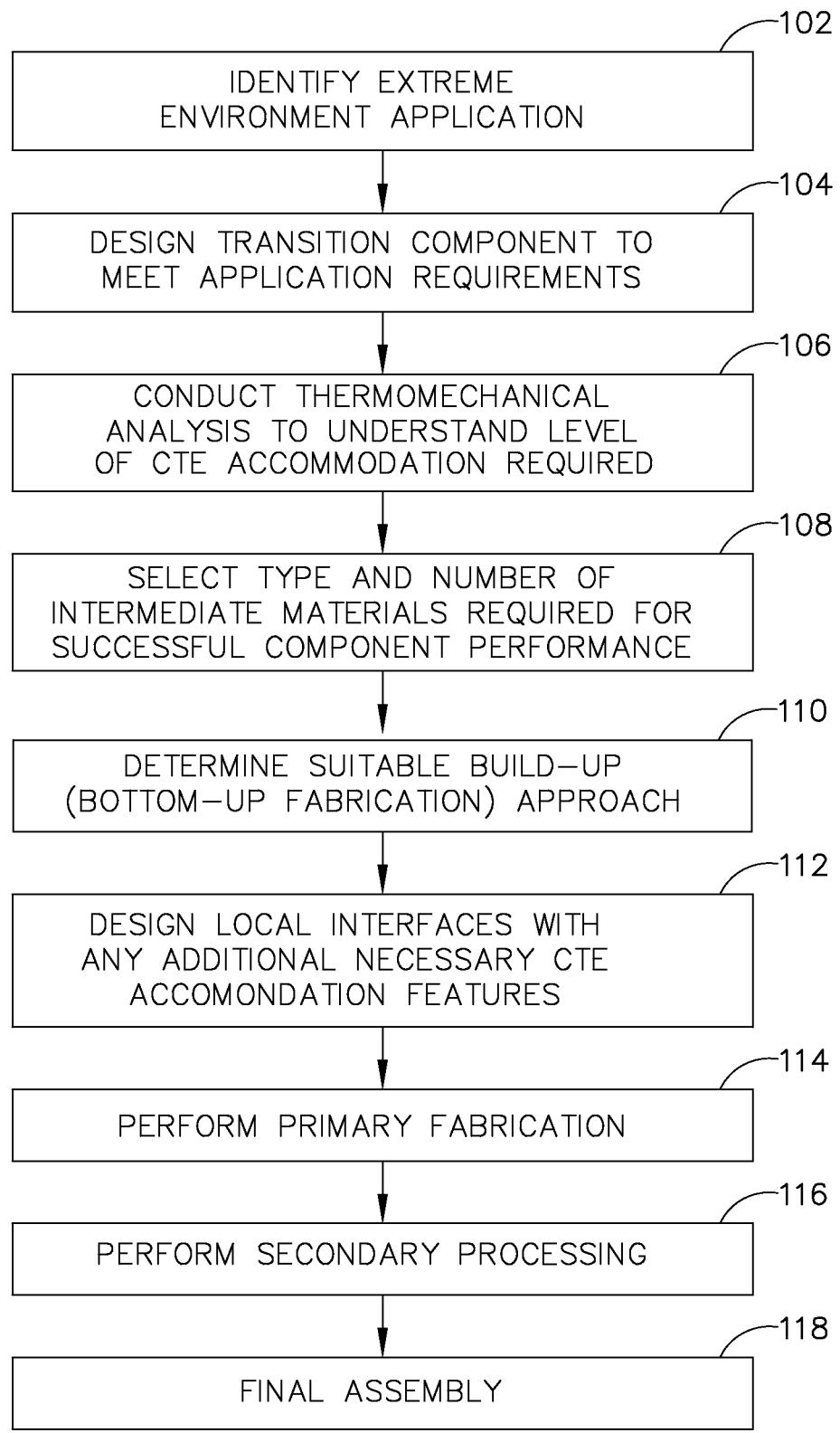
FIG. 1 is a flow chart of the generalized method presented herein.

Creation of a composite structure with a graded coefficient of thermal expansion to interconnect separate members with vastly different CTEs such as a ceramic matrix composite thruster chamber to a titanium injector in a rocket engine assembly (to be described as Example 1 with respect to FIGS. 9A-9D subsequently) or a ceramic matrix composite exhaust nozzle to an Inconel 718 flange in an aircraft engine (to be described as Example 2 with respect to FIGS. 10A-10D subsequently) employs a process as shown in FIG. 1. The application and environment are determined, step 102 and a transition component between the members is designed, step 104. Several specific examples of such applications are discussed in detail subsequently. A thermomechanical analysis is conducted to understand the level of CTE accommodation required, step 106. The type and number of intermediate materials required for successful component performance are then selected, step 108, for the graded CTE composite. A determination of the suitable build-up method for the designed CTE-graded layered composite is made, step 110. Local interfaces with any additional necessary CTE accommodation features are designed, step 112. Primary fabrication of the CTE laminate is then performed, step 114, with the selected fabrication approach. Secondary processing is performed, step 116, on the CTE-graded layered composite to create the finalized component as designed. Final assembly, step 118, is then undertaken of the created CTE-graded component and the other members.

Figure 2:
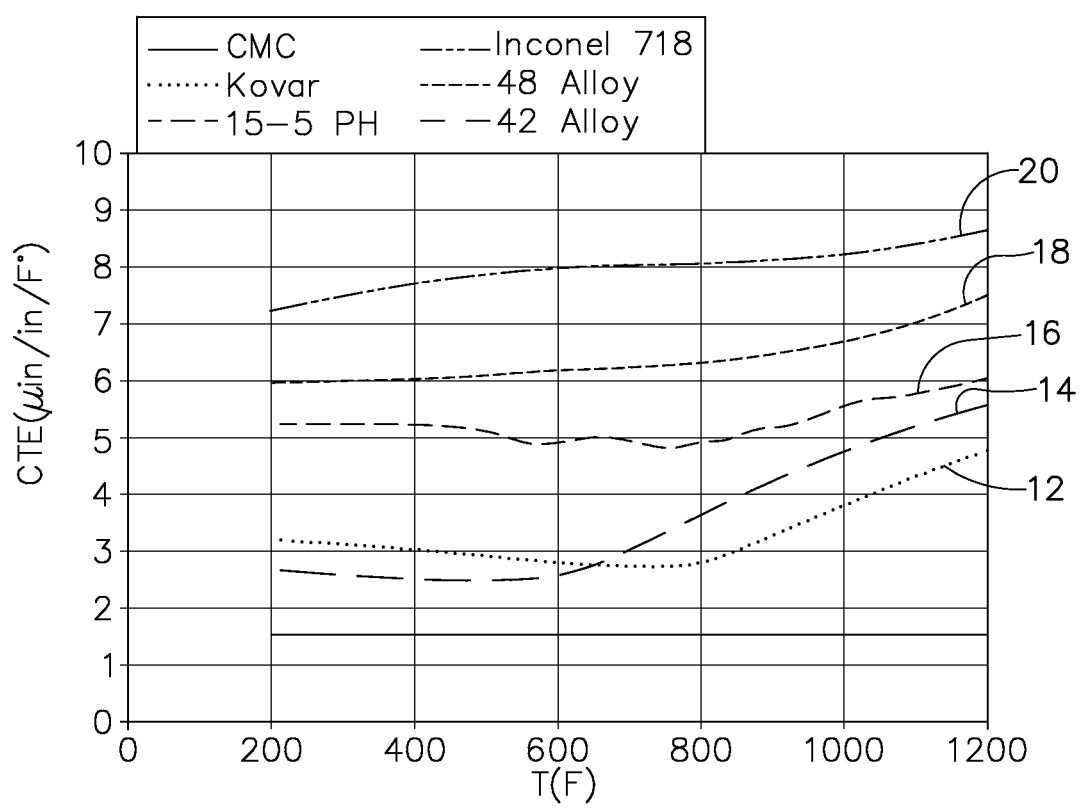
FIG. 2 is a graph of CTE as a function of temperature for a set of exemplary alloys employed to produce typical CTE-graded layered composite structures.

In an exemplary application where the intention is to attach a very high CTE member (e.g. one made from Inconel 718) to a very low CTE member (e.g. one made from an advanced extreme environment material such as a ceramic matrix composite) in an assembly which will be cycled between room temperature and 1200 F, the graded materials could be selected from Kovar, designated element 12, for a first layer, Alloy 42, designated element 14, for a second layer, Alloy 48, designated element 16, for a third layer, 15-5PH, designated element 18, for a fourth layer and Inconel 718, designated element 20, for a fifth layer. Values of CTE as a function of temperature for the exemplary materials of the graded composite in this example are shown in FIG. 2.

Build-up fabrication processes using typical metal deposition techniques are employed in a first embodiment to create a composite billet or near net shape with graded CTE materials. As shown in FIG. 3A, laser assisted near net shape manufacturing, laser sintering, spray forming or thermal spray forming nominally shown as bolts 29a are employed to produce the CTE-graded layered composite near net shape preform 30a. Hot isostatic pressing (HIP) or other consolidation processes for densification and property enhancement nominally shown as pressure arrows 31a are employed as shown in FIG. 3B to produce an intermediate near net shape 32a and heat treatment is employed for creating the final near net shape composite 33a as shown in FIG. 3C. While shown in the drawing with distinct layers of the CTE graded composite in FIG. 3C for simplicity, a final built-up CTE-graded layered composite near net shape may have blended properties creating a smooth transition from the first CTE interface surface 34 to the second CTE interface surface 36, as shown in FIG. 3D. Alternatively, as shown in FIG. 3E, laser assisted near net shape manufacturing, laser sintering, spray forming or thermal spray forming nominally shown as bolts 29b are employed to produce the CTE-graded layered composite billet preform 30b. Hot isostatic pressing (HIP) or other consolidation processes for densification and property enhancement nominally shown as pressure arrows 31b are employed as shown in FIG. 3F to produce an intermediate billet 32b and heat treatment is employed for creating the final composite billet 33b as shown in FIG. 3G. While shown in the drawing with distinct layers of the CTE graded composite in FIG. 3G for simplicity, a final built-up CTE-graded layered composite billet may have blended properties creating a smooth transition from the first CTE interface surface 34 to the second CTE interface surface 36, as shown in FIG. 3H.

Figure 3I:
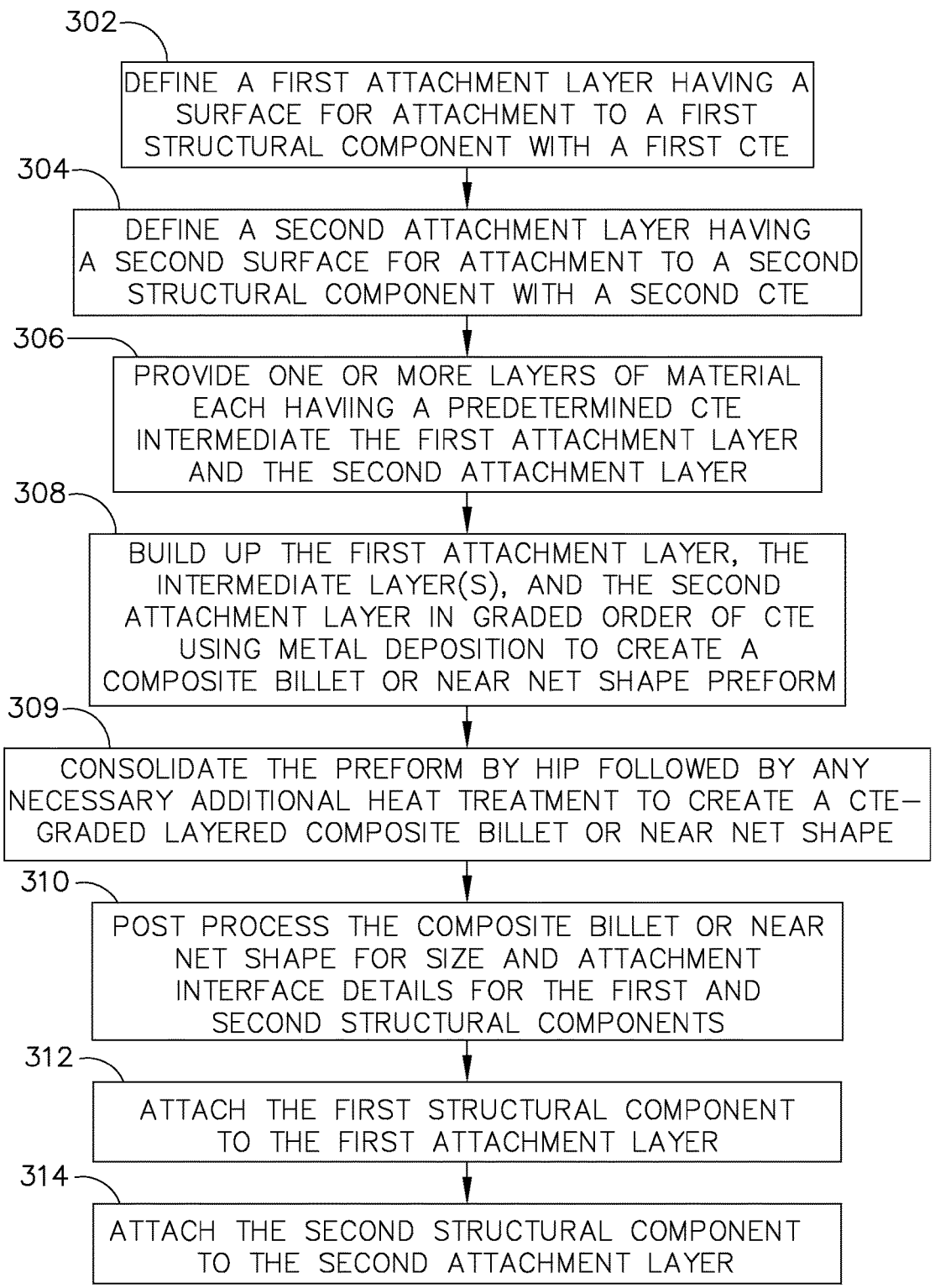
FIG. 3I is a flow chart of the process to produce the CTE-graded layered composite structure of FIGS. 3A-H.

FIG. 3I provides an operational method to implement preparation of the graded composites as described previously. A first attachment layer having a surface for attachment to a first structural component with a first CTE is defined 302 and a second attachment layer having a second surface for attachment to a second structural component with a second CTE is defined 304. One or more layers of material each having a predetermined CTE intermediate the first attachment layer and the second attachment layer are provided 306 and buildup of the first attachment layer, the intermediate layer(s), and the second attachment layer in graded order of CTE to create a composite billet or near net shape perform is accomplished 308. The buildup processing may include forms of metal deposition processing such as laser assisted near net shape manufacturing, laser sintering, spray forming or thermal spray forming. The preform is then consolidated by HIP followed by any necessary additional heat treatment to create a CTE-graded layered composite billet or near net shape 309. The composite billet or near net shape is then post processed for sizing and attachment interface details for the first and second structural components 310. The first structural component is then attached to the first attachment layer 312 and the second structural component is attached to the second attachment layer 314.

Figure 4A:
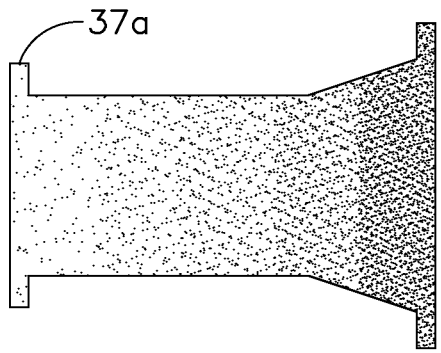
FIGS. 4A and 4B are representations of typical powder metallurgy processing steps to produce a CTE-graded layered composite near net shape.
Figure 4B:
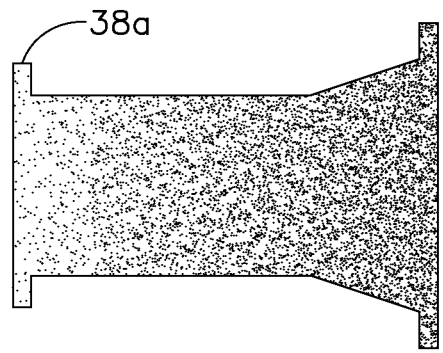
Figure 4C:
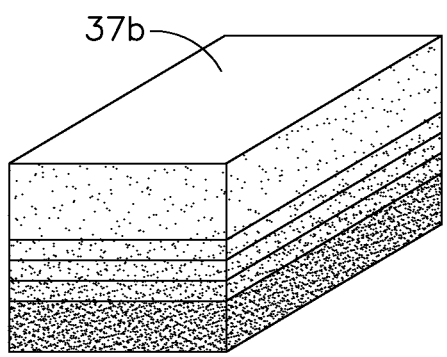
FIGS. 4C and 4D are representations of typical power metallurgy processing steps to produce a CTE-graded layered composite billet.
Figure 4D:
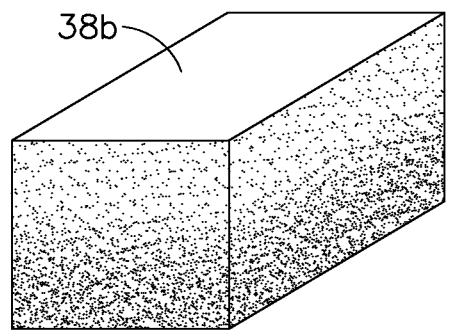

Build-up fabrication processes using typical powder metallurgy techniques are employed in a second embodiment to create a composite billet or near net shape with graded CTE materials. As represented in FIG. 4A, a CTE-graded layered composite near net shape preform 37a is built with a graded base elemental powder chemistry corresponding to the desired CTE gradation and other additives typically used in powder metallurgy processing and compacted. Typical consolidation and HIP processing is then employed to create a built-up CTE-graded layered composite 38a in near net shape, as shown in FIG. 4B. Alternatively, as shown in FIG. 4C, a CTE-graded layered composite billet preform 37b is built with a graded base elemental powder chemistry corresponding to the desired CTE gradation and other additives typically used in powder metallurgy processing and compacted. Typical consolidation and HIP processing is then employed to create a built-up CTE-graded layered composite 38b in billet form, as shown in FIG. 4D.

Figure 4E:
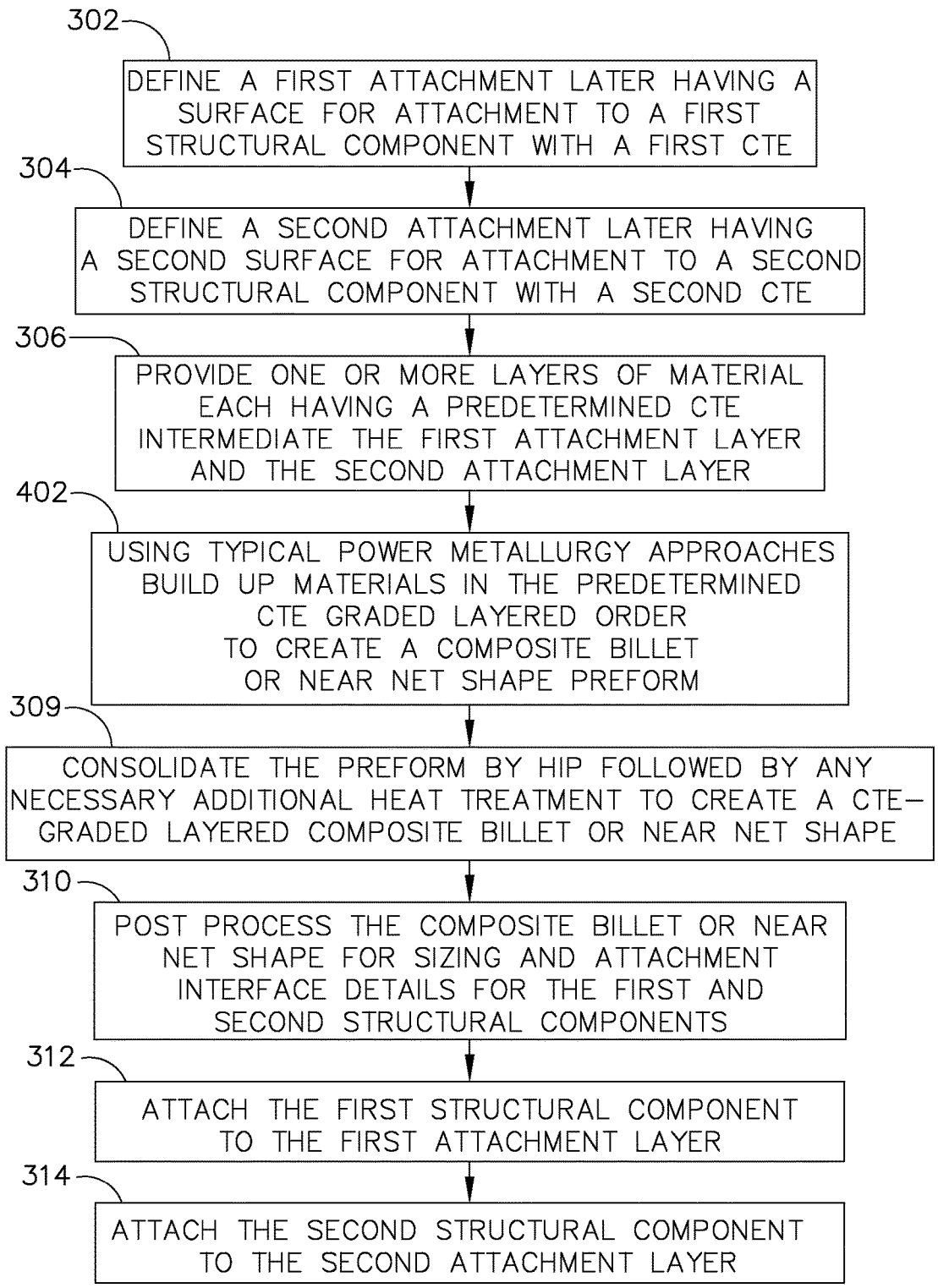
FIG. 4E is a flow chart of the process to produce the CTE-graded layered composite structure of FIGS. 4A-D.

FIG. 4E provides an operational method to implement preparation of the graded composites mentioned above. A first attachment layer having a surface for attachment to a first structural component with a first CTE is defined 302 and a second attachment layer having a second surface for attachment to a second structural component with a second CTE is defined 304. One or more layers of material each having a predetermined CTE intermediate the first attachment layer and the second attachment layer are provided 306 and using typical powder metallurgy approaches build up the first attachment layer, the intermediate layer(s), and the second attachment layer in the predetermined CTE-graded layered order to create a composite billet or near net shape preform is accomplished 402. The buildup processing, identified as process A, may include various forms of powder metallurgy processing. The preform is then consolidated by HIP followed by any necessary additional heat treatment to create a CTE-graded layered composite billet or near net shape 309. The composite billet or near net shape is then post processed for sizing and attachment interface details for the first and second structural components 310. The first structural component is then attached to the first attachment layer 312 and the second structural component is attached to the second attachment layer 314.

Figure 5D:
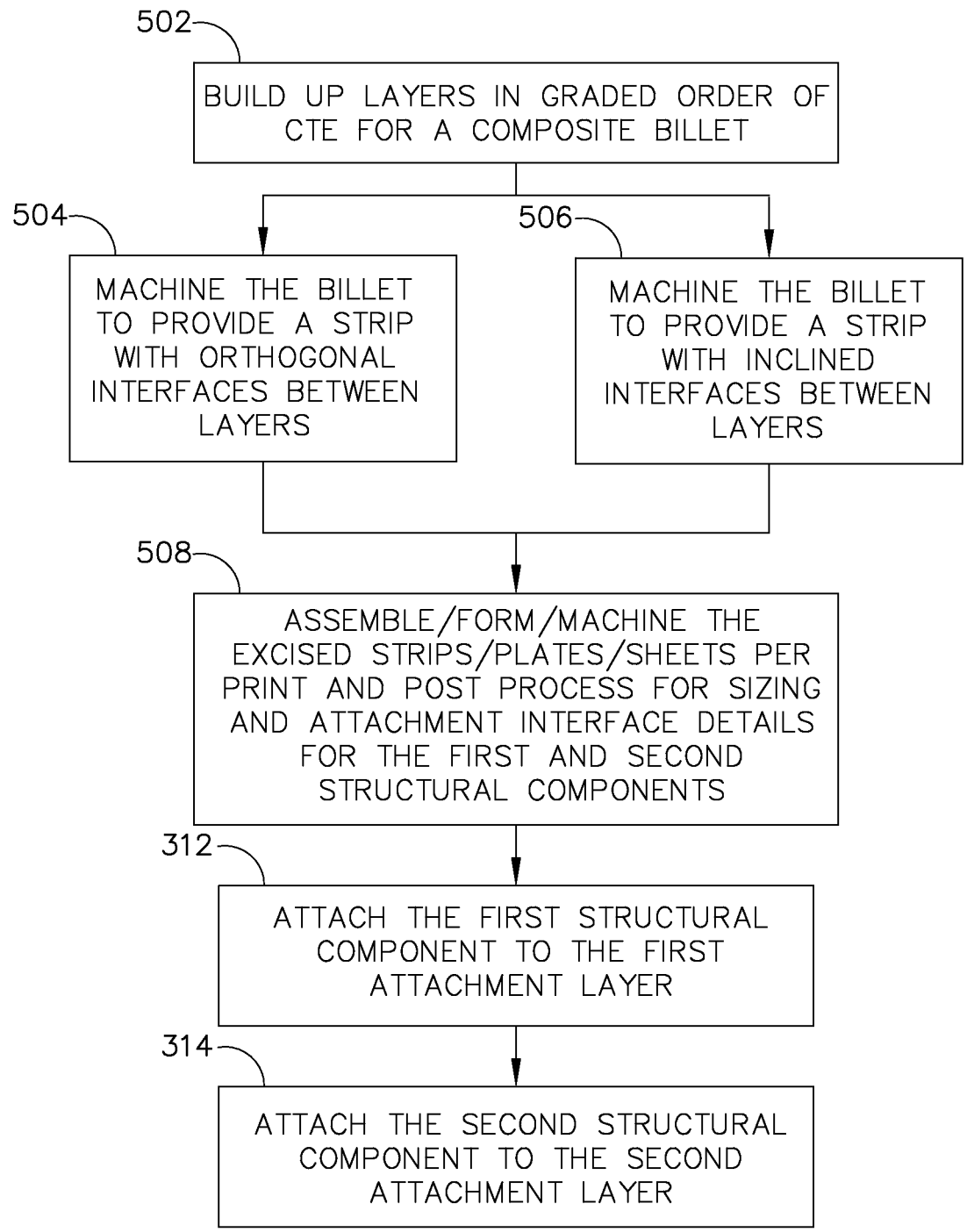
FIG. 5D is a flow chart of the process to produce the CTE-graded layered composite structure of FIGS. 5A-C.

As shown in FIGS. 5A-C, various interface designs to optimize joint integrity are employed. The base CTE-graded layered composite billet 10 shown in FIG. 5A formed by build-up processes described with respect to FIGS. 3G, 3H, and 4D, can be machined as reflected in the method of FIG. 5D in secondary processing for various mating surface configurations. A substantially orthogonal interface between layers can be achieved as shown in FIG. 5B for a composite connection strip 39 having graded CTE layer interfaces 40 substantially perpendicular to the longitudinal axis of the strip. The composite billet built up with layers in graded order of CTE, step 502 is machined to provide a strip with orthogonal interfaces between layers 504. Alternatively as shown in FIG. 5C, the billet is machined or processed to provide composite strip 42 having inclined mating interfaces 44 between the layers in step 506 to better accommodate local stresses due to CTE gradients. Widths of the intermediate layers is determined based on the overall desired CTE performance of the composite and can be varied for individual layers based on expansion performance of that material relative to adjacent layer materials. The excised strips, sheets, or plates are then assembled/formed/machined per print and post processed for sizing and attachment interface details for the first and second structural components 508.

Figure 6A:
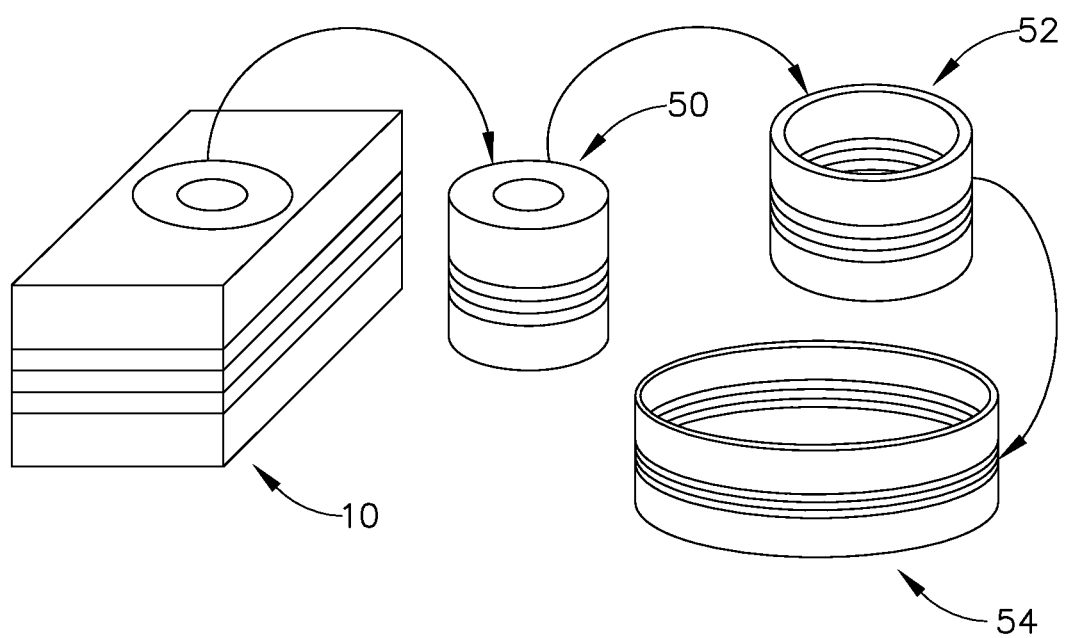
FIGS. 6A and 6B are a flow diagram representation and flow chart of process steps in producing a net shape interface ring from a CTE-graded layered composite billet.
Figure 6B:
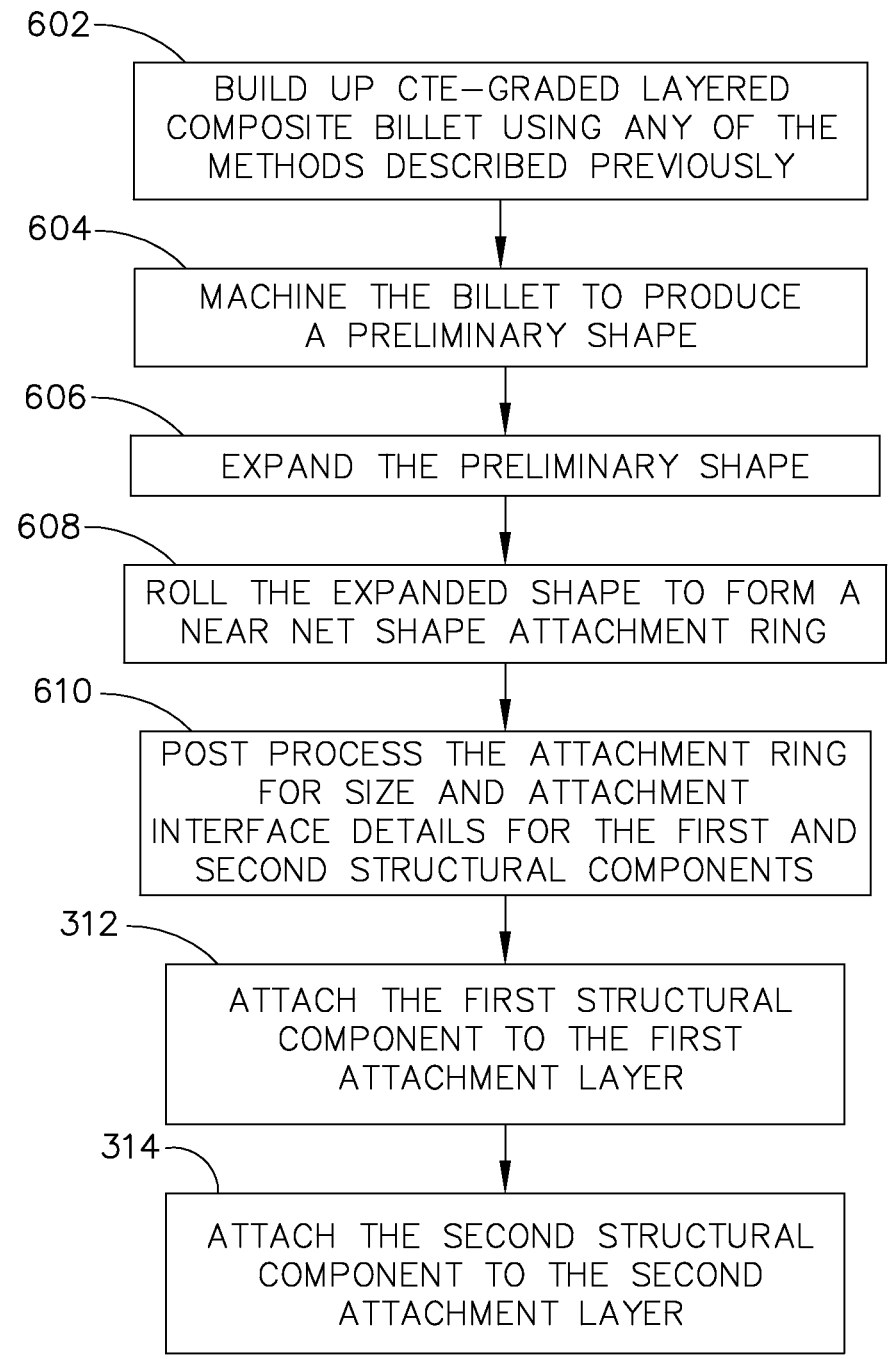

CTE-graded composite structures as defined in the examples above can be tailored to inherently accommodate for any CTE mismatch between members of an assembly that is being heated or cooled. The graded CTE composite alleviates the requirement for complicated mechanical fastening devices to allow for relative movement between members with different CTEs. Simple and conventional joining techniques can be employed for attaching the members, thus avoiding high costs, complex designs, and weight penalties. The processing approach allows for fabrication of the CTE-graded integrated composite structure in various elemental geometries (e.g. rings, strips, blocks, etc.), which can subsequently be used directly to attach members with vastly different CTE to produce an assembly that can be heated or cooled without introducing significant thermal stresses or strains. Additionally, the elemental geometries can be post processed (e.g. machined, formed, etc.) to form new structures that can then be used as a CTE-graded component in an extreme environment application. As shown in FIGS. 6A and 6B, the CTE-graded layered composite billet 10, formed by any of the build-up methods 602, as described above, may be machined to produce a preliminary shape 50 in step 604, expanded/forged in step 606 to intermediate shape 52 and then rolled in step 608 to form a near net shape attachment ring 54. The attachment ring is then post processed for sizing and attachment interface details for the first and second structural components in step 610.

Figure 7A:
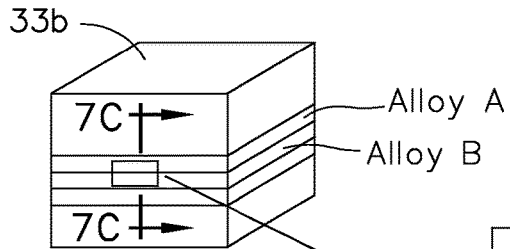
FIGS. 7A-C are representations of an exemplary method to further minimize CTE mismatch at local interlayer interfaces by alternating several thin interlayers to promote local blending of alloy A-alloy B interlayer.
Figure 7B:
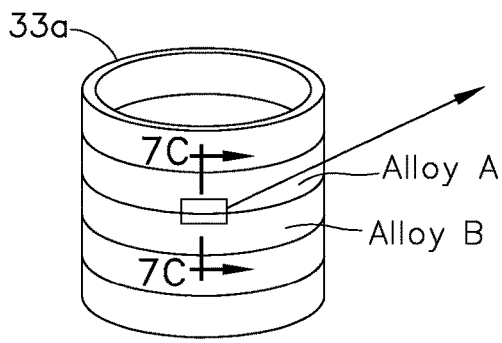
Figure 7C:
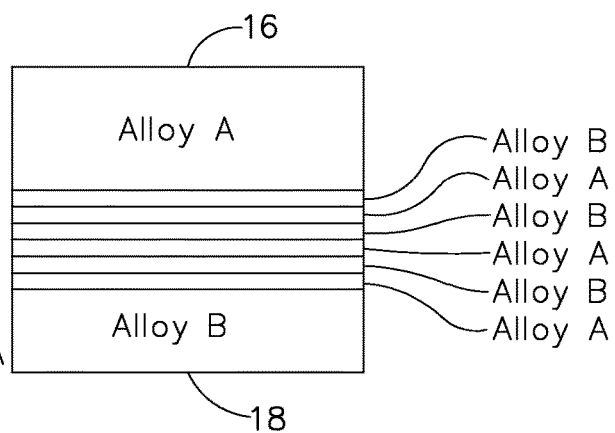
Figure 7D:
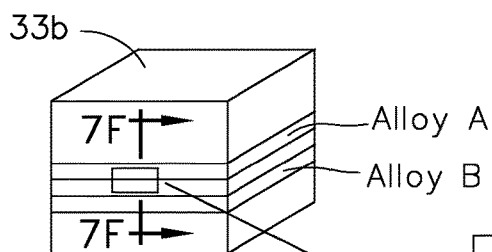
FIGS. 7D-E are representations of an exemplary method to further minimize CTE mismatch at local interlayer interfaces by gradually blending compositions at alloy A-alloy B interlayer.
Figure 7E:
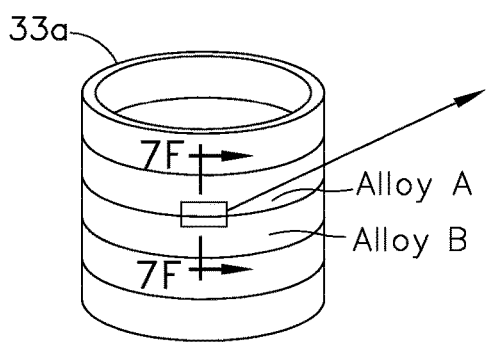
Figure 7F:
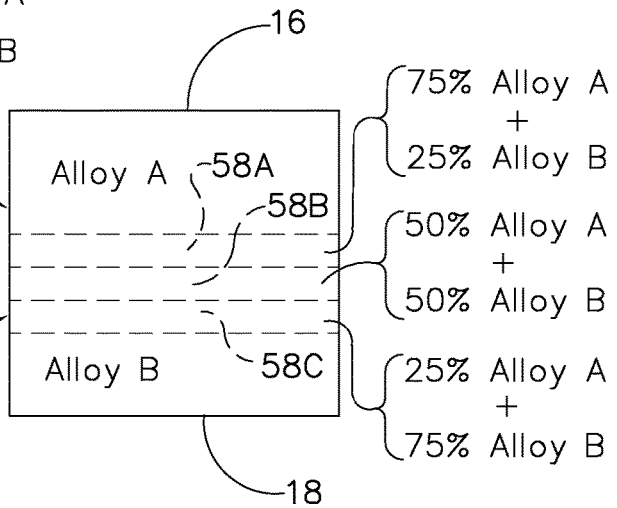
FIG. 7F is a flow chart of the process to produce local interfaces with additional necessary CTE accommodation features in the typical CTE-graded layered composite structure of FIGS. 7A-C and 7D-E.
Figure 7G:
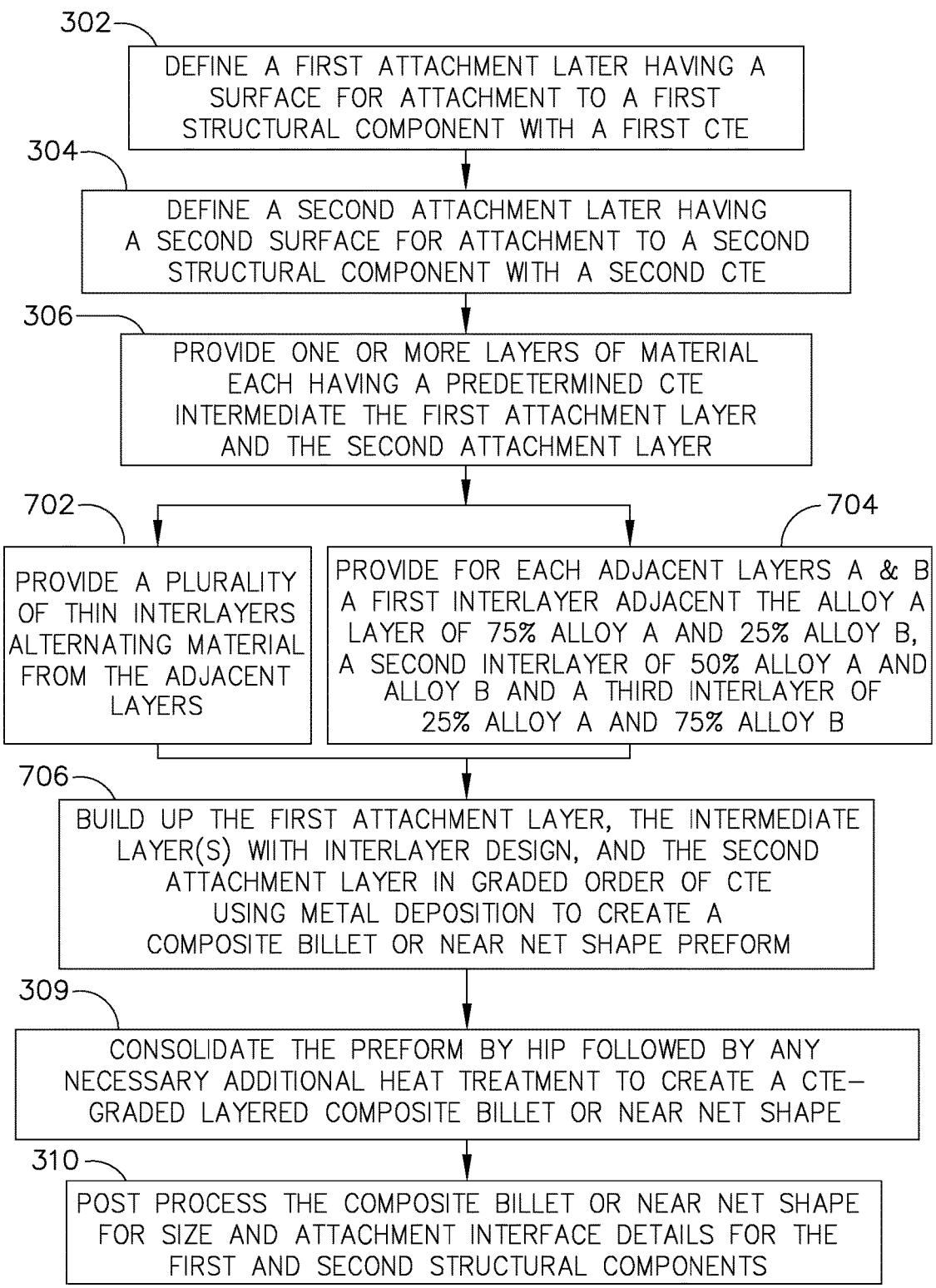
FIG. 7G is a flow chart describing the process to produce local interfaces with additional necessary CTE accommodation features in the typical CTE-graded layered composite structures of FIGS. 7A-C and 7D-F.

Assemblies created from the CTE-graded layered composite billets and near net shapes using methods described above will normally accommodate extreme environment application and processing thermomechanical loads (e.g. being heated or cooled) without introducing significant thermal stresses or strains. However, there may be instances where due to either the severity of local processing or application thermomechanical loads, a need will exist to further minimize CTE mismatch at local interlayer interfaces. FIGS. 7A and 7B show an initial near net shape component 33a or billet 33b as described previously. FIG. 7C is a representation of an exemplary method to further minimize CTE mismatch at local interlayer interfaces of such billets or near net shape components by alternately depositing several thin interlayers 56 to promote local blending of an interlayer between the adjacent layers annotated alloy A-alloy B arbitrarily shown as the Alloy 48, element 16, and 15-5PH, element 18 layers from the five layer example initially described. In the example shown, each thin interlayer is created by thin alternating layers of alloy A and alloy B. FIG. 7F is a representation of an exemplary method to further minimize CTE mismatch at local interlayer interfaces of near net shape components 38a or billets 38b as shown in FIGS. 7D and 7E by gradually blending compositions at an alloy A-alloy B interlayer using mixed metal interlayers 58a-58c. A first interlayer 58a adjacent the alloy A layer of 75% alloy A and 25% alloy B, a second interlayer 58b of 50% of alloy A and alloy B and a third interlayer 58c of 25% alloy A and 75% alloy B adjacent the alloy B layer are shown as examples. The flow chart of the process to produce local interfaces with additional necessary CTE accommodation features in the typical CTE-graded layered composite structure of FIGS. 7A-C and 7D-F is shown in FIG. 7G.

The interface design incorporates the initial graded CTE layers as previously described with respect to FIG. 3I, a first attachment layer having a surface for attachment to a first structural component with a first CTE is defined 302 and a second attachment layer having a second surface for attachment to a second structural component with a second CTE is defined 304. One or more layers of material each having a predetermined CTE intermediate the first attachment layer and the second attachment layer are provided 306. A plurality of thin interlayers is provided alternating material from the adjacent layers 702 or, alternatively, for each adjacent layers A and B a first interlayer adjacent the alloy A layer of 75% alloy A and 25% alloy B, a second interlayer of 50% of alloy A and alloy B and a third interlayer of 25% alloy A and 75% alloy B is provided 704. Build up is made using the first attachment layer, the intermediate layer(s) with the interlayer design, and the second attachment layer in graded order of CTE using metal deposition to create a composite billet or near net shape preform 706. The secondary processing and attachment to the structural members is then accomplished as described in FIG. 3I.

Figure 8A:
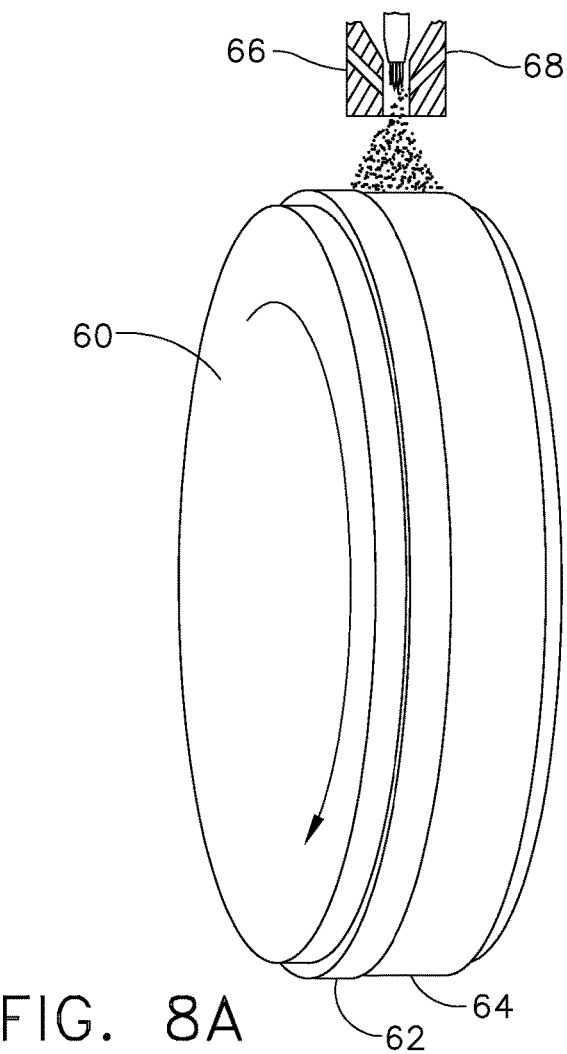
FIG. 8A is a representation of an exemplary method to produce a CTE-graded layered composite structure by thermal spray processing on a rotating mandrel.
Figure 8B:
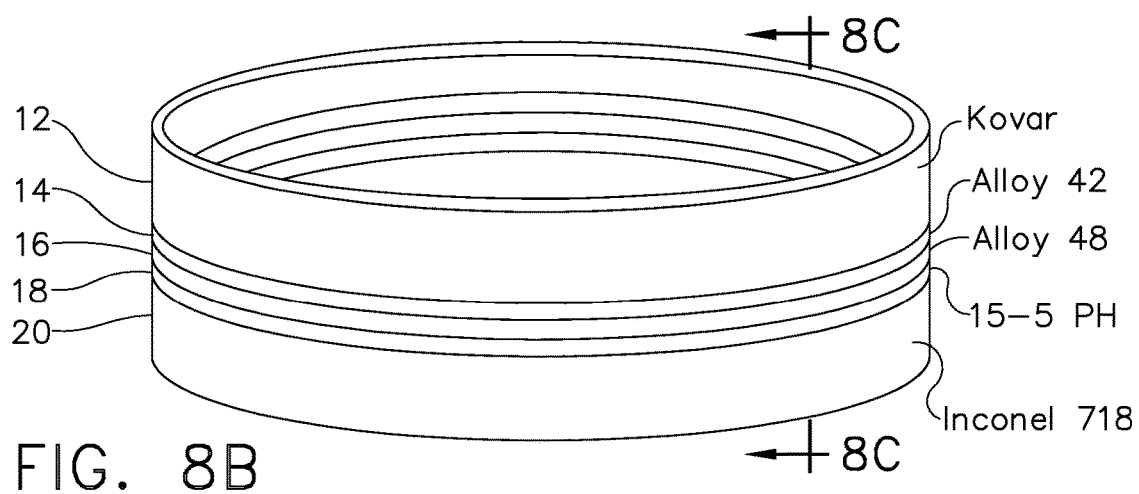
FIG. 8B is a representation of the ring produced by the method employed in FIG. 8A.
Figures 8C, 8D:
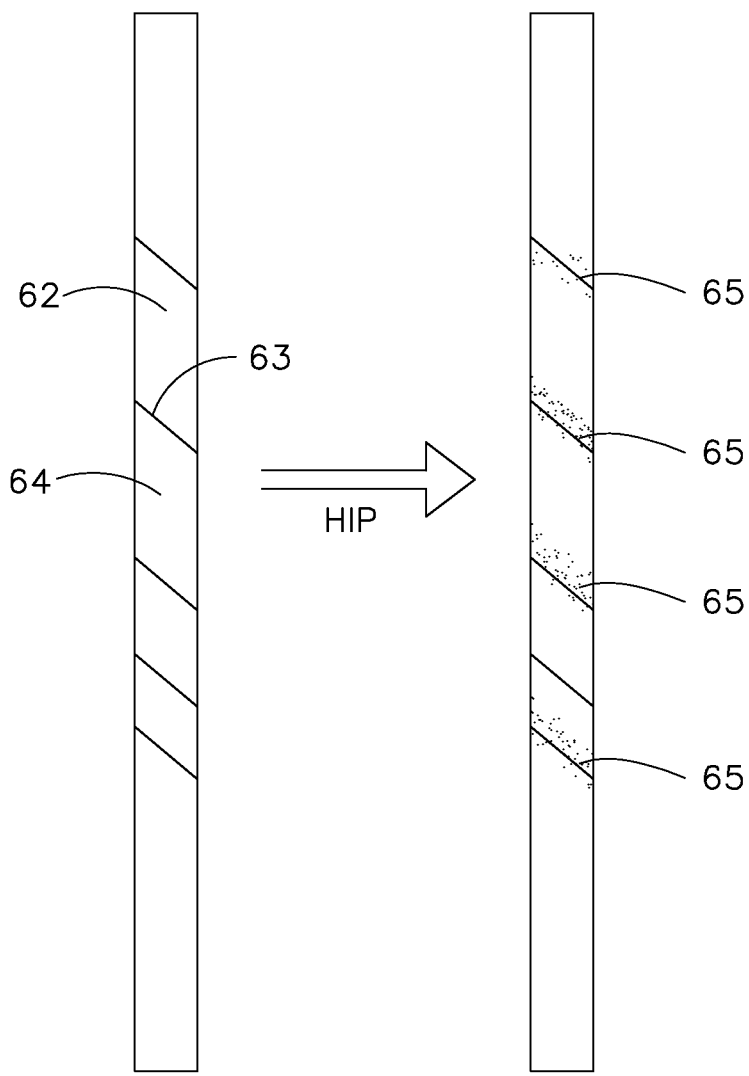
FIGS. 8C and 8D are section views from FIG. 8B showing further minimizing of CTE mismatch at local interfaces using scarfed interlayers in the CTE-graded layered composite structure pre and post-secondary treatment.
Figure 8E:
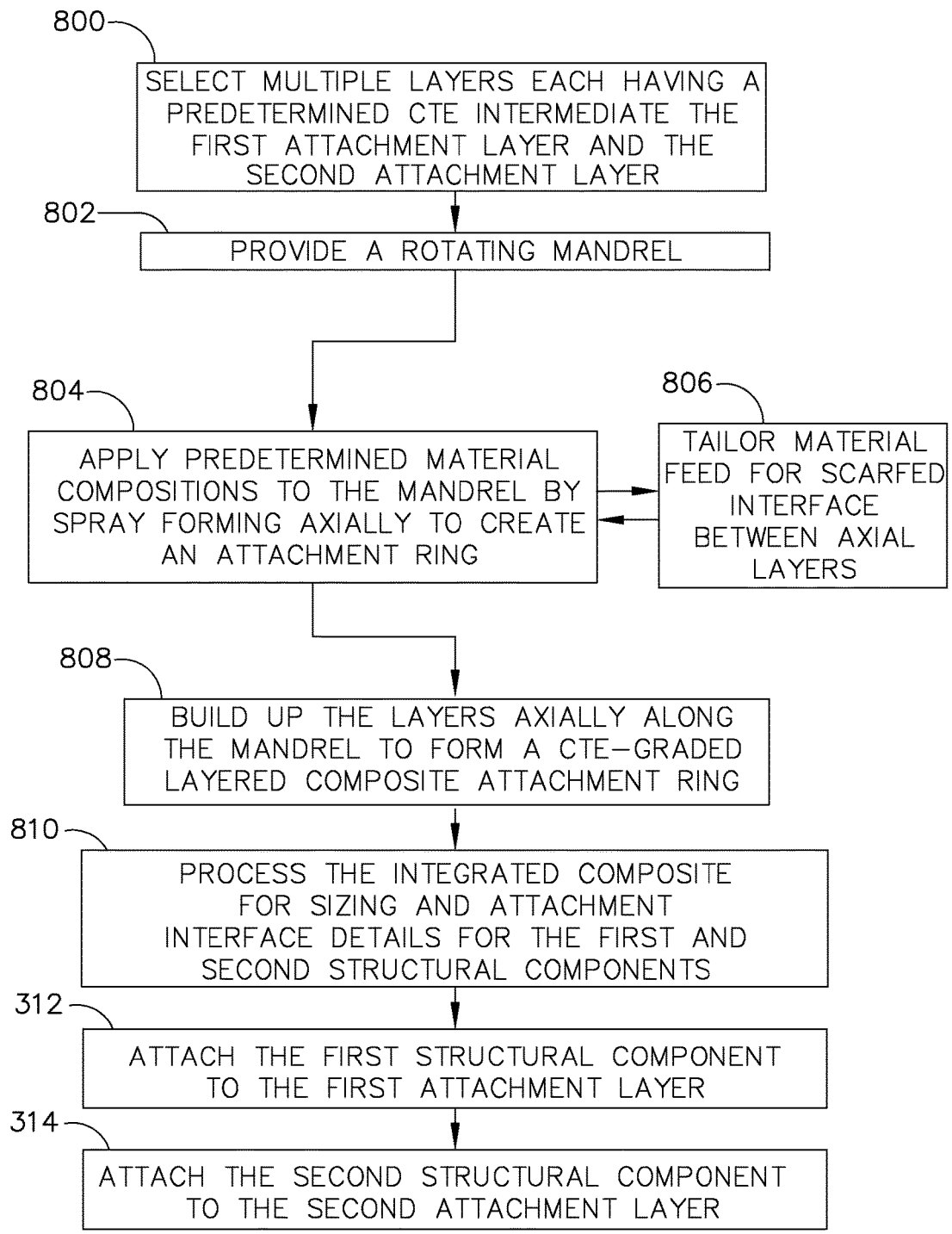
FIG. 8E is a flow chart of the process to produce local interfaces with additional necessary CTE accommodation features in the CTE-graded layered composite structure of FIGS. 8A-D.

Near net shape CTE-graded layered composite attachment ring structures are beneficial to many extreme environment structures that commonly required large cylindrical interattachment components. As will be discussed below, thermal spray processing, which is a common metal deposition build-up fabrication approach can be used to address this need. As shown in FIG. 8A, a mandrel 60 is employed for deposition of differing CTE layers 62, 64 in an axial relationship using a plasma spray torch or gun 66 having an annular powder feed 68. The axial layers form a near net shape CTE-graded layered composite attachment ring shown in FIG. 8B. To minimize CTE mismatch at local interfaces, the material feed can be tailored to produce a scarfed interface 63 between the axial layers, as shown in FIG. 8C. To further enhance the mechanical and thermal properties of the local interlayer interfaces, hot isostatic pressing (HIP) is then employed to create a region of interdiffusion of alloy constituents 65 at the scarfed interlayer interfaces as shown in FIG. 8D. The process reflected in FIG. 8E provides for selecting multiple layers each having a predetermined CTE intermediate the first attachment layer and the second attachment layer 800 and providing a rotating mandrel 802 on which the predetermined material compositions are applied by spray forming axially to create an attachment ring 804. The material feed is tailored to produce a scarfed interface between each of the axial layers 806. The layers are added axially along the mandrel to form a CTE-graded layered composite attachment ring 808. The mandrel is removed providing a near net interface ring which can then be machined or chemical milled (chem milled) for final attachment interfaces to the high differential CTE components 810 as previously described.

The following examples of commonly existing attachment/sealing needs in extreme environment applications are offered as exemplary methods for incorporating the CTE-graded layered composite structures described in the embodiments above to develop rigid, aerodynamic, light weight, simple, and inexpensive structures that can be used to attach/seal members with vastly different CTE to produce an assembly that can be heated or cooled without introducing significant thermal stresses or strains in extreme environment applications.

Example 1—Attachment of a Ceramic Matrix Composite Thruster Chamber to a Titanium Injector in a Rocket Engine Assembly The most common material of construction of a rocket chamber is a silicide coated Nb alloy. The operating temperature limited to 2500 F (~50% of combustion temperature) and fuel film cooling is employed to maintain this thermal limit. The use of extensive amounts of fuel film cooling may significantly degrade performance and may represent a source of plume contamination. The key to high performance is the combustion chamber material life limiting mechanisms. Another challenging issue for high performance is providing leak-free joints while attaching combustion chamber to injector/valve/mounts (which need to be maintained at low temperatures). Currently, Nb rocket chambers are welded directly to the injectors.

The use of ceramic matrix composite chambers can enable the design of higher performance rocket engines with reduced plume contamination and high thermal margin (much closer to maximum possible performance for common propellants, compared to current Nb chambers) to operate at conventional temperatures and provide increased life for reusable spacecraft. The challenge of providing a leak-free attachment between the ceramic matrix composite combustion chamber 72 to a titanium injector 74, as shown in FIG. 9B, since they cannot be directly welded and other attachment options are not practical due to the dramatic CTE mismatch, can be addressed employing the embodiments described previously to create a CTE-graded layered composite attachment component.

Figure 9A:
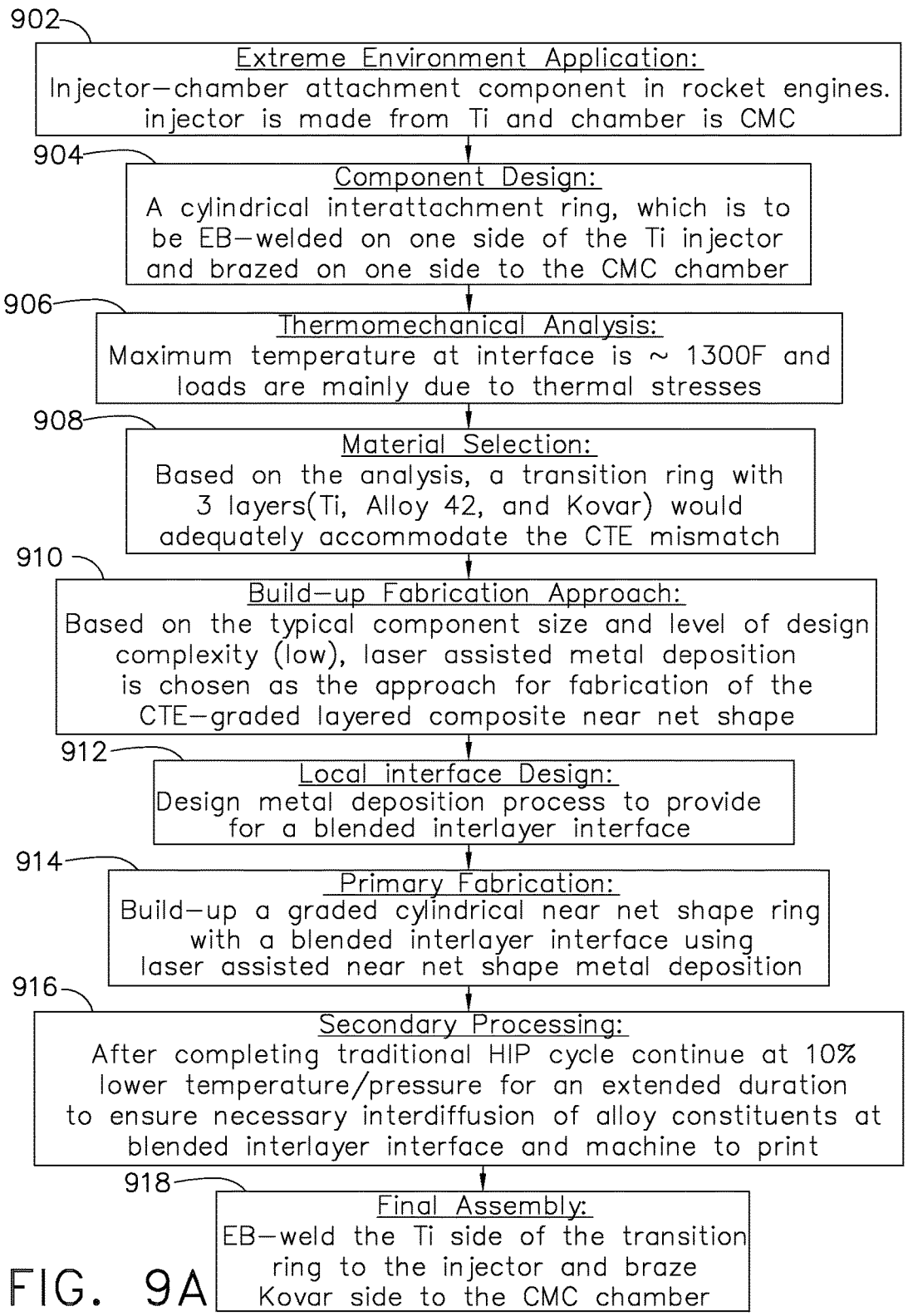
FIG. 9A is a flow chart of an exemplary process for creation of an aerospace structure employing a CTE-graded layered composite as a rocket engine injector—thruster chamber interattachment component.
Figure 9B:
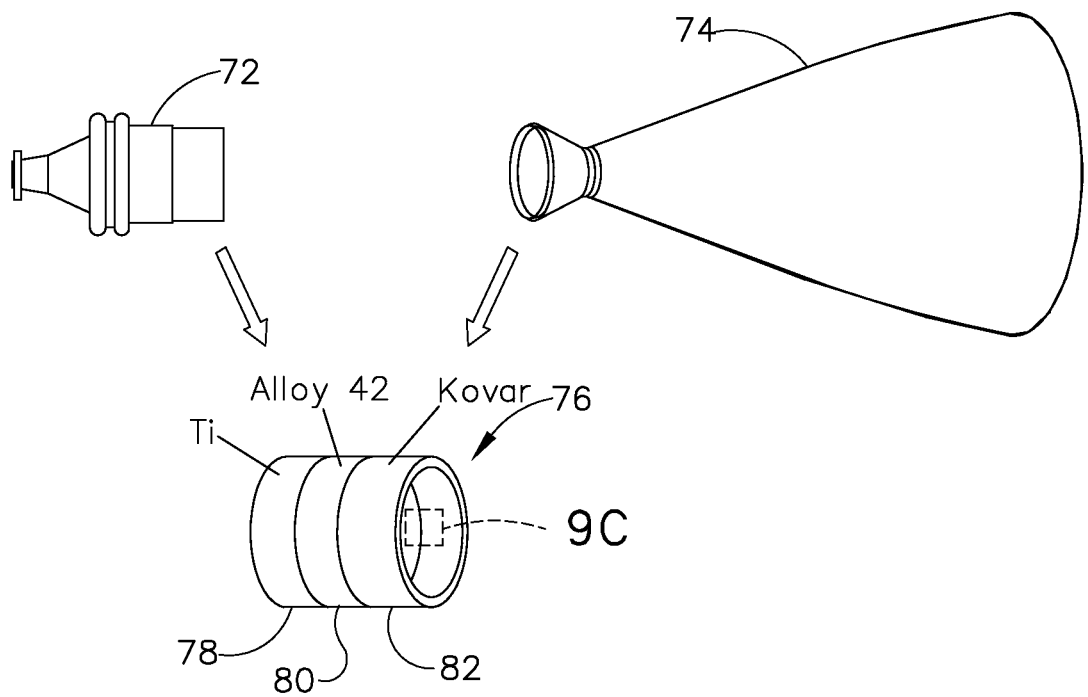
FIG. 9B is an exploded view of the rocket chamber and injector components to be joined using the process of FIG. 9A.
Figure 9C:
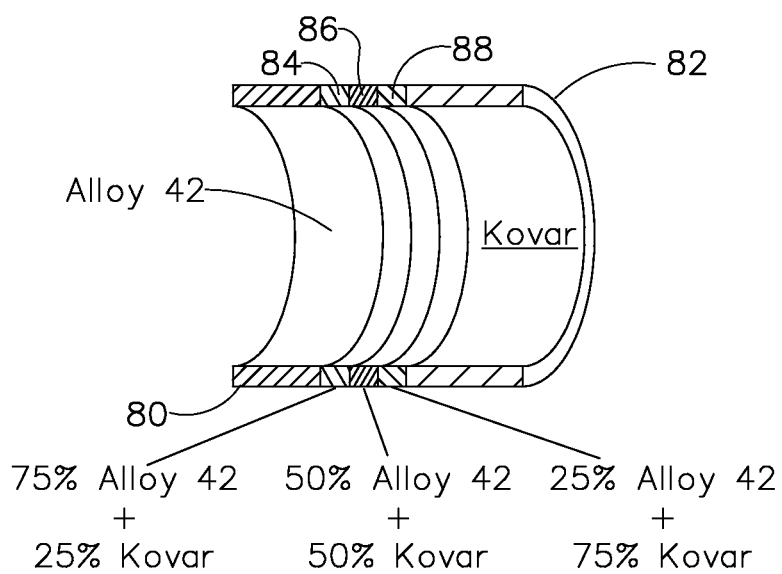
FIG. 9C is a section view of the layered composite connecting ring.
Figure 9D:
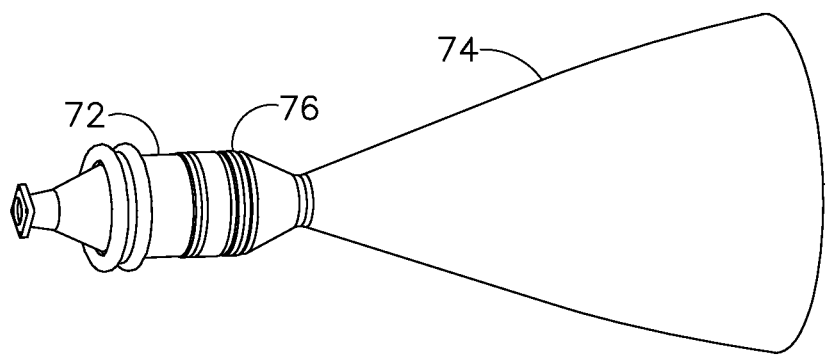
FIG. 9D pictorial view of the assembled rocket engine structure.

The method shown in FIG. 9A provides for assessment of the extreme environment application 902, which for the example shown is the injector-chamber attachment component in a rocket engine with the injector fabricated from titanium and the chamber constructed from CMC. Component design 904 is then accomplished providing a cylindrical interattchment ring which is to be EB-welded on one side to the titanium injector and brazed on the opposite side to the CMC chamber. A thermomechanical analysis is then undertaken 906 which demonstrates a maximum temperature at the interface of approximately 1300 F and mechanical loads which are mainly due to thermal stresses. The temperature dependent CTE properties of each member are evaluated to determine the level of CTE mismatch. The level of heating/cooling (temperature gradients encountered during service) and the thermomechanical loading conditions in the assembly are evaluated. Material selection 908 is then accomplished. For the exemplary application, a transition ring 76 with three layers, titanium 78, alloy 42 80 and Kovar 82 laminates as shown in FIG. 9B, adequately accommodates the CTE mismatch. An initial powder chemistry is chosen for a suitable layer buildup such as the process previously described with respect to FIGS. 3A-3D. The buildup fabrication approach 910 is chosen which for the embodiment shown which typical component size and low level of design complexity is a laser assisted metal deposition process for near net shape as previously described with respect to FIGS. 3A-3D. A local interface design 912 is chosen to provide for a blended interlayer interface which, for the exemplary application, constitutes powder or wire feed for initial layering of 75% Alloy 42 and 25% Kovar, 84, second transition layering of 50% Alloy 42 and 50% Kovar, 86 and a third transition layering of 75% Kovar and 25% Alloy 42, 88 as show in FIG. 9C and previously described with respect to FIG. 7F. The primary fabrication 914 is then accomplished for buildup of the graded cylindrical ring with blended interlayer interface as described using laser assisted near net shape metal deposition. Secondary processing 916 is then accomplished using post thermomechanical treatment to include HIP continuing at 10% lower temperature and pressure for an extended duration to ensure necessary interdiffusion of alloy constituents at the blended interlayer interfaces. The ring is then further post processed by machining to print. Final assembly 918 is accomplished by EB welding the titanium side 78 of the composite transition ring 76 to the injector 74 and brazing of the Kovar side 82 to the nozzle 72 for the finished assembly as shown in FIG. 9D.

Example 2—Attachment of a Ceramic Matrix Composite Exhaust Nozzle to an Inconel 718 Flange in an Aircraft Engine Aircraft engines may offer better fuel economy by running the combustor section at higher temperatures. Metallic alloys conventionally used for the exhaust systems may have an undesirably short operating life at the higher temperatures. Replacing the current metallic exhaust system with ceramic matrix composites will resolve this issue and may potentially help reduce weight. However, such a ceramic matrix composite exhaust system (very low CTE) should be designed to mate to a superalloy engine interface (very high CTE). The challenge of providing a leak-free attachment between the ceramic matrix composite nozzle 90 and a superalloy flange 92 (e.g. made of Inconel 718) as shown in FIG. 10B, since they cannot be directly welded and other attachment options are not practical due to the dramatic CTE mismatch, can be addressed using the embodiments described. To accomplish this, a high temperature metallic adapter ring 94 is required, which incorporates features suitable for mating with the low strain-to-failure ceramic matrix composite. This interface design needs to accommodate the huge CTE mismatch between the Inconel 718 flange and the ceramic matrix composite nozzle.

Figure 10A:
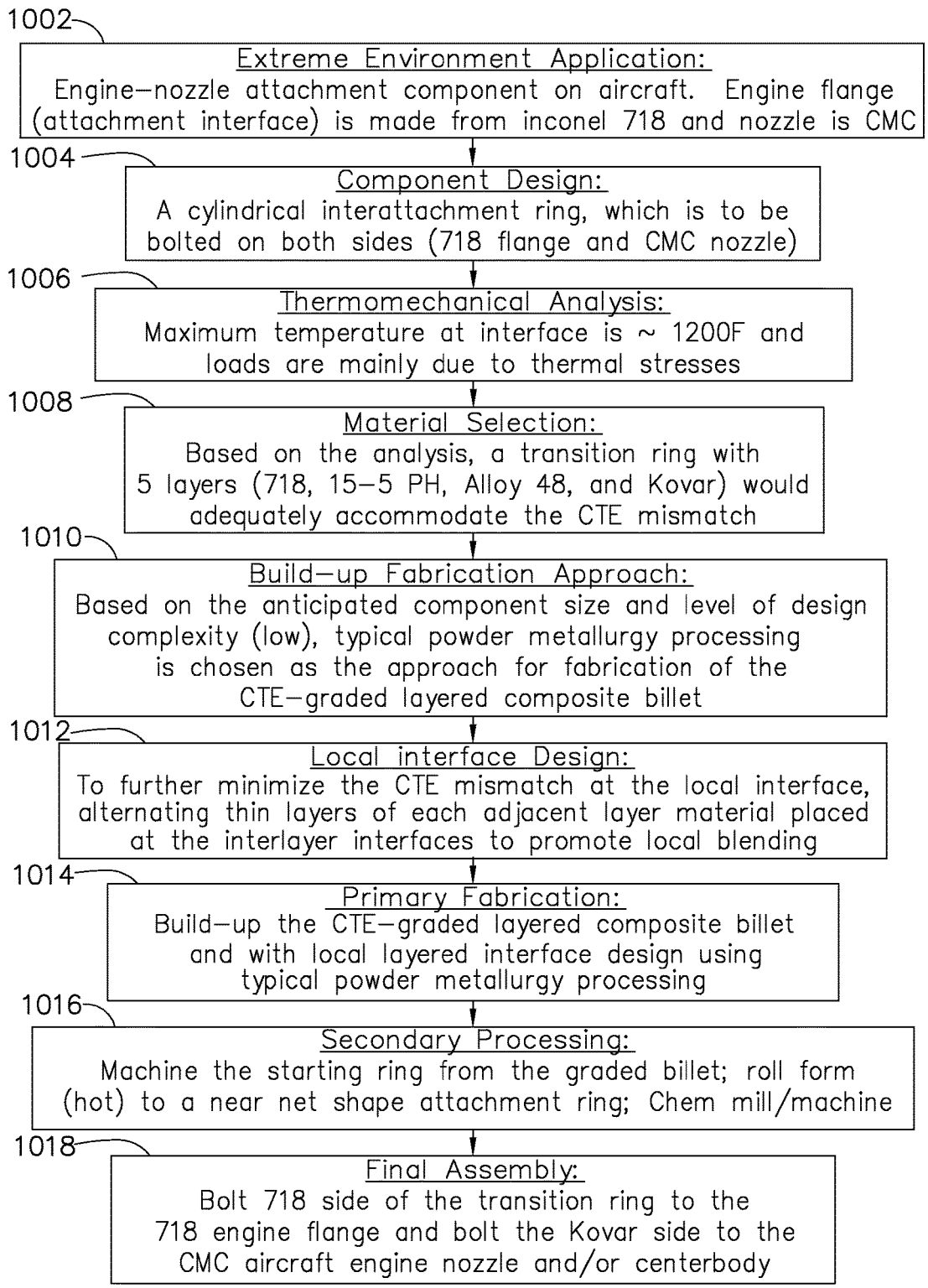
FIG. 10A is a flow chart of an exemplary process for creation of an aerospace structure employing a CTE-graded layered composite as an aircraft engine—nozzle interattachment component.
Figure 10B:
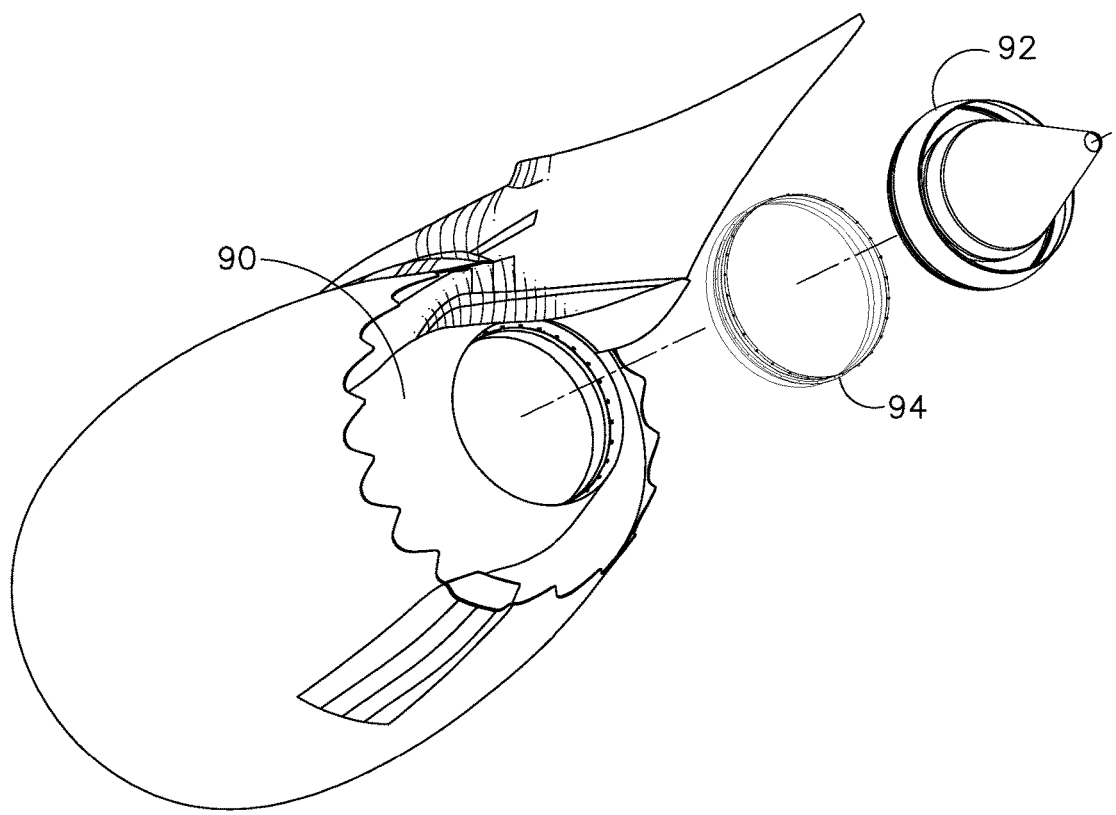
FIG. 10B is an exploded view of an aircraft engine having a ceramic matrix composite exhaust nozzle to be connected to an Inconel 718 flange.
Figure 10C:
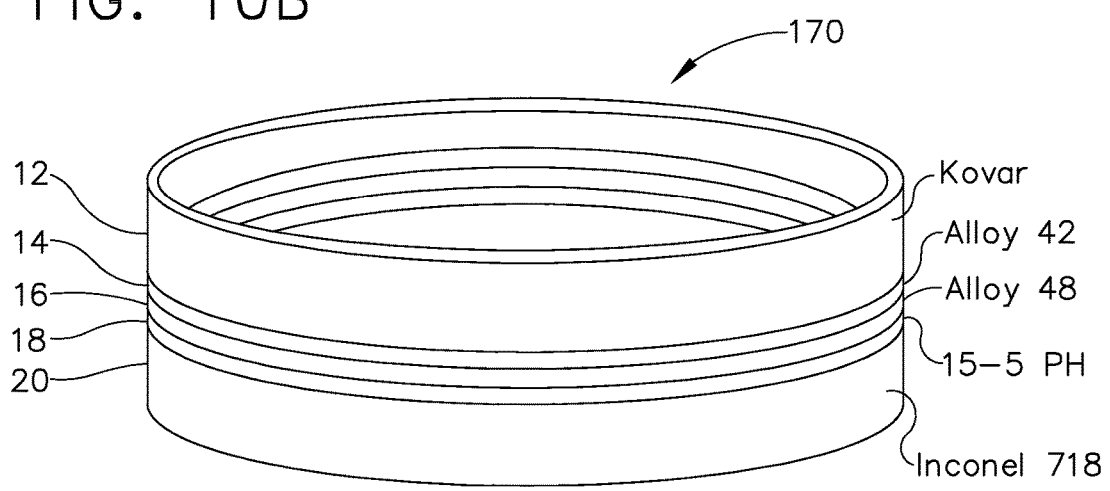
FIG. 10C is a pictorial view of the CTE-graded layered composite connector ring attached to the ceramic matrix composite exhaust nozzle and the final assembly.

The method shown in FIG. 10A provides for determining an extreme environment application 1002 which constitutes the engine-nozzle attachment component for an aircraft wherein the engine flange is Inconel 718 and the nozzle is CMC. A component design is made 1004 which calls for a cylindrical interattachment ring which is to be bolted to the 718 flange at a first side and the CMC nozzle at the opposite side. A thermomechanical analysis is conducted 1006 which defines the maximum temperature at the interface of approximately 1200 F with loads mainly due to thermal stresses. Material selection is made 1008 for the interattachment ring with a five layer laminate as shown in FIG. 10C incorporating an Inconel 718 layer 20, 15-5 PH layer 18, Alloy 48 layer 16, Alloy 42 layer 13 and Kovar layer 12 with properties as previously described with respect to FIG. 2 to accommodate the CTE mismatch between the 718 flange and CMC nozzle. A build-up fabrication approach is selected 1010 based on anticipated component size and low level of design complexity for a powder metallurgy processing approach to fabrication of a CTE-graded billet as described with respect to FIGS. 4C and 4D. Local interface design is made 1012 using alternating thin layers of each adjacent layer material placed at the interlayer interfaces to promote local blending as previously described with respect to FIGS. 7A and 7C. Primary fabrication is then accomplished 1014 building up the CTE-graded layered composite billet with the local layered interface design using typical powder metallurgy processing. Secondary processing is then conducted 1016 machining the billet to provide a starting ring and then hot roll forming to a near net shape as previously described with respect to FIGS. 6A and 6B. The attachment ring is then chemically milled (chem milled) and machined to final interface dimensions. Final assembly 1018 is then accomplished by bolting the 718 engine flange to the 718 side of the CTE-graded composite ring and bolting the CMC nozzle to the Kovar side of the ring.

Figure 10D:
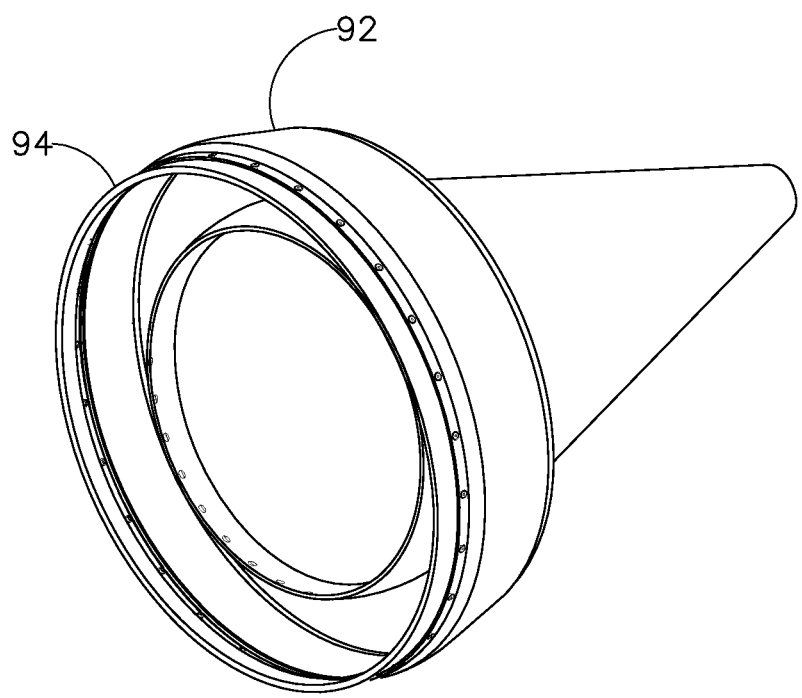
FIG. 10D is an isometric view of the assembled ceramic matrix composite exhaust nozzle and CTE graded integrated composite interface ring created using the process of FIG. 10A.

FIG. 10D shows exemplary ceramic matrix composite exhaust nozzle 90 attached to CTE graded integrated composite interface ring 94 created using the process of FIG. 10A.

Figure 11:
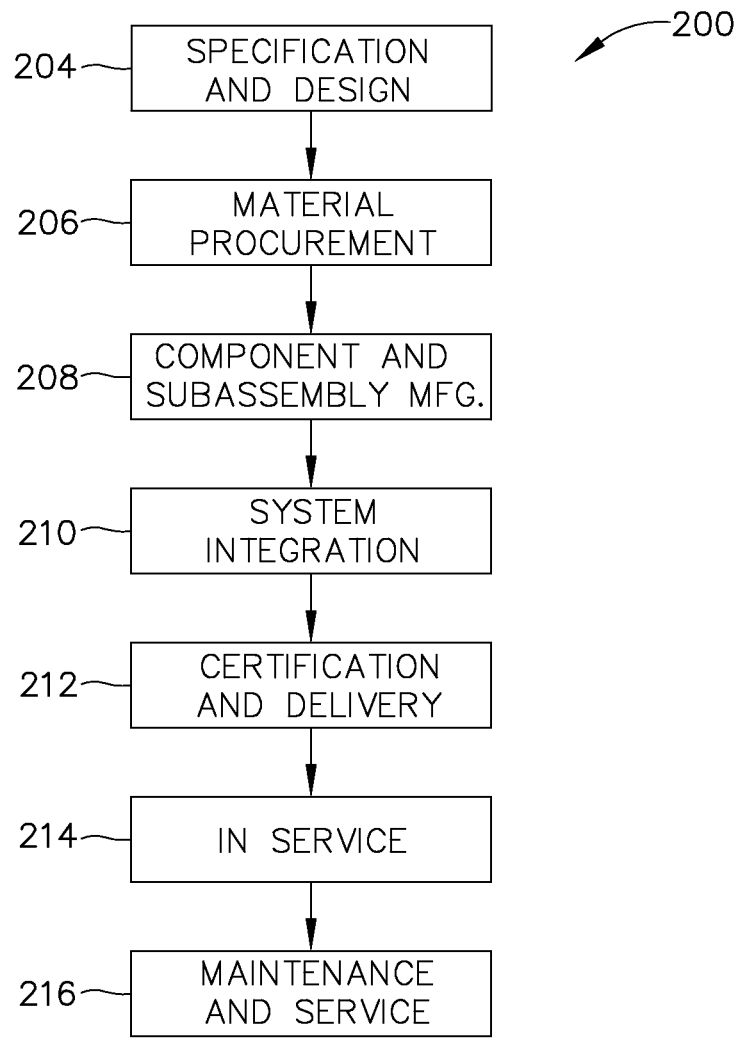
FIG. 11 is a flow diagram of an aerospace vehicle production and service methodology.
Figure 12:
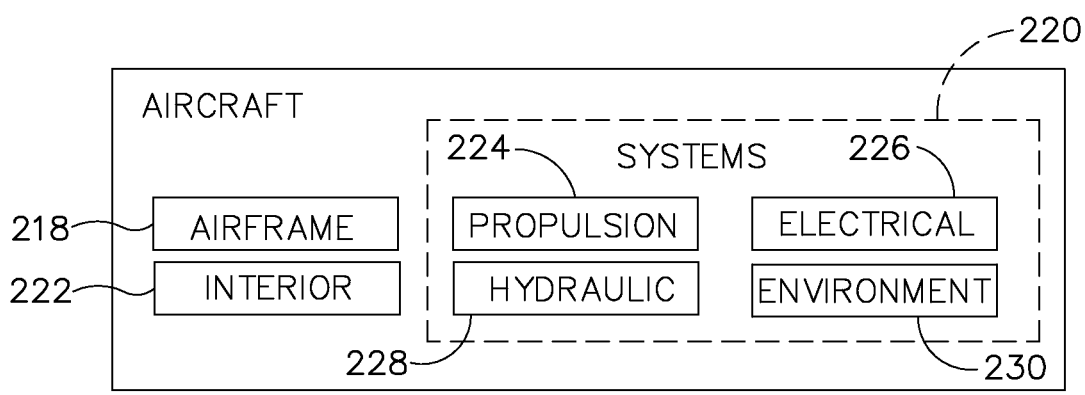
FIG. 12 is a block diagram of an aircraft as exemplary of the aerospace vehicle in FIG. 11.

Referring FIGS. 11 and 12, embodiments of the disclosure may be described in the context of a manufacturing and service method 200 as shown in FIG. 11 and an aerospace vehicle or aircraft 202 as shown in FIG. 12. For the description of FIGS. 11 and 12 an aircraft that would incorporate an engine as described with respect to Example 2 herein is disclosed, however, the vehicle may be a rocket, spacecraft or other vehicle including aerospace, marine, combat systems and other vehicular applications. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 202 produced by exemplary method 200 may include an airframe 218 with a plurality of systems 220 and an interior 222. Examples of high-level systems 220 include one or more of a propulsion system 224, an electrical system 226, a hydraulic system 226, and an environmental system 230.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, for maintenance and service 216.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for producing an integrated composite interface with a graded coefficient of thermal expansion (CTE) comprising the steps of:
    identifying a first CTE for a first structural member, wherein the first structural member comprises a ceramic matrix composite chamber;
    identifying a second CTE for a second structural member, wherein the second structural member comprises a titanium injector;
    selecting a plurality of layers of graded CTE, wherein each layer has a CTE between the first CTE and the second CTE;
    building up the layers to form a CTE graded integrated composite employing powder metallurgy processing; and
    processing the integrated composite to produce a first surface for attachment of the first structural member having the first CTE and to produce a second surface for attachment of the second structural member having the second CTE.

2. The method of claim 1, wherein the step of selecting a plurality of layers further comprises:
    selecting an alloy for each of the plurality of layers from a group of alloys comprising, by mass, a first alloy of 53% Fe, 29% Ni, 18% Co, a second alloy of 42% Ni, 0.02% C, 0.4% Mn, 0.15% Si, Balance Fe, a third alloy of 48% Ni, 52% Fe, a fourth alloy of 15% Cr, 5.1% Ni, 0.3% Cb, 3.2% Cu, Balance Fe and a fifth alloy of 52% Ni, 19% Cr, 3% Mo, 5% Cb, 0.9% Ti, 0.5% Al, 18% Fe.

3. The method of claim 1, wherein the step of building up layers further comprises:
    building up the layers to provide a graded CTE billet.

4. The method of claim 3, wherein the step of the step of processing the integrated composite further comprises:
    machining the billet to provide a strip with orthogonal interfaces between layers.

5. The method of claim 3, wherein the step of the step of processing the integrated composite further comprises:
    machining the billet to provide a strip with inclined interfaces between layers.

6. The method of claim 3, wherein the step of the step of processing the integrated composite further comprises:
    machining the billet to produce a preliminary shape,
    expanding the preliminary shape, and
    rolling the expanded shape to form a near net shape attachment ring.

7. The method of claim 1, wherein the step of selecting a plurality of layers of graded CTE further comprises:
    providing interlayers between first and second adjacent layers with a first interlayer having a material composition of about 75% of the material of the first adjacent layer and about 25% of the material of the second adjacent layer, a second interlayer having a material composition of about 50% of the material of the first adjacent layer and about 50% of the material of the second adjacent layer and a third interlayer having a material composition of about 25% of the material of the first adjacent layer and about 75% of the material of the second adjacent layer.

8. A method for producing an integrated composite interface with a graded coefficient of thermal expansion (CTE) comprising the steps of:
    identifying a first CTE for a first structural member, wherein the first structural member comprises a ceramic matrix composite chamber;
    identifying a second CTE for a second structural member, wherein the second structural member comprises a titanium injector;
    using powder metallurgy to produce a CTE graded preform that transitions between the first CTE and the second CTE;
    consolidating the preform;
    heat treating the consolidated preform to create a CTE graded integrated composite billet; and
    forming the billet to provide a first surface for attachment of the first structural member having the first CTE and a second surface of for attachment of the second structural member having the second CTE.

9. The method of claim 8, wherein the step of consolidating comprises hot isostatic pressing.

10. A method for producing an integrated composite interface with a graded coefficient of thermal expansion (CTE) comprising the steps of:
    identifying a first CTE for a first structural member, wherein the first structural member comprises a ceramic matrix composite chamber;
    identifying a second CTE for a second structural member, wherein the second structural member comprises a titanium injector;
    using powder metallurgy to produce a CTE graded preform in near net shape that transitions between the first CTE and the second CTE;
    consolidating the preform;

heat treating the consolidated preform to create a CTE graded near net shape component; and forming the component to provide a first surface for attachment of the first structural member having the first CTE and a second surface of for attachment of the second structural member having the second CTE.

11. The method of claim 10, wherein the step of consolidating comprises hot isostatic pressing.

12. A method for producing an integrated composite interface with a graded coefficient of thermal expansion (CTE) comprising the steps of:

identifying a first CTE for a first structural member, wherein the first structural member comprises a ceramic matrix composite exhaust nozzle;

identifying a second CTE for a second structural member, wherein the second structural member comprises an alloy aircraft engine nozzle attachment flange;

selecting a plurality of layers of graded CTE, wherein each layer has a CTE between the first CTE and the second CTE;

building up the layers to form a CTE graded integrated composite employing powder metallurgy processing; and processing the integrated composite to produce a first surface for attachment of the first structural member having the first CTE and to produce a second surface for attachment of the second structural member having the second CTE.

13. The method of claim 12, wherein the step of selecting a plurality of layers further comprises:

selecting an alloy for each of the plurality of layers from a group of alloys comprising, by mass, a first alloy of 53% Fe, 29% Ni, 18% Co, a second alloy of 42% Ni, 0.02% C, 0.4% Mn, 0.15% Si, Balance Fe, a third alloy of 48% Ni, 52% Fe, a fourth alloy of 15% Cr, 5.1% Ni, 0.3% Cb, 3.2% Cu, Balance Fe and a fifth alloy of 52% Ni, 19% Cr, 3% Mo, 5% Cb, 0.9% Ti, 0.5% Al, 18% Fe.

14. The method of claim 12, wherein the step of building up layers further comprises:

building up the layers to provide a graded CTE billet.

15. The method of claim 14, wherein the step of the step of processing the integrated composite further comprises:

machining the billet to provide a strip with orthogonal interfaces between layers.

16. The method of claim 14, wherein the step of the step of processing the integrated composite further comprises:

machining the billet to provide a strip with inclined interfaces between layers.

17. The method of claim 14, wherein the step of the step of processing the integrated composite further comprises:

machining the billet to produce a preliminary shape;

expanding the preliminary shape; and rolling the expanded shape to form a near net shape attachment ring.

18. The method of claim 12, wherein the step of selecting a plurality of layers of graded CTE further comprises:

providing interlayers between first and second adjacent layers with a first interlayer having a material composition of about 75% of the material of the first adjacent layer and about 25% of the material of the second adjacent layer, a second interlayer having a material composition of about 50% of the material of the first adjacent layer and about 50% of the material of the second adjacent layer and a third interlayer having a material composition of about 25% of the material of the first adjacent layer and about 75% of the material of the second adjacent layer.

19. A method for producing an integrated composite interface with a graded coefficient of thermal expansion (CTE) comprising the steps of:

identifying a first CTE for a first structural member, wherein the first structural member comprises a ceramic matrix composite exhaust nozzle;

identifying a second CTE for a second structural member, wherein the second structural member comprises an alloy aircraft engine nozzle attachment flange;

using powder metallurgy to produce a CTE graded preform that transitions between the first CTE and the second CTE;

consolidating the preform;

heat treating the consolidated preform to create a CTE graded integrated composite billet; and forming the billet to provide a first surface for attachment of the first structural member having the first CTE and a second surface of for attachment of the second structural member having the second CTE.

20. The method of claim 19, wherein the step of consolidating comprises hot isostatic pressing.

21. A method for producing an integrated composite interface with a graded coefficient of thermal expansion (CTE) comprising the steps of:

identifying a first CTE for a first structural member, wherein the first structural member comprises a ceramic matrix composite exhaust nozzle;

identifying a second CTE for a second structural member, wherein the second structural member comprises an alloy aircraft engine nozzle attachment flange;

using powder metallurgy to produce a CTE graded preform in near net shape that transitions between the first CTE and the second CTE;

consolidating the preform;

heat treating the consolidated preform to create a CTE graded near net shape component; and forming the component to provide a first surface for attachment of the first structural member having the first CTE and a second surface of for attachment of the second structural member having the second CTE.

22. The method of claim 21, wherein the step of consolidating comprises hot isostatic pressing.

* * * * *